(12) United States Patent
Salunkhe et al.

(10) Patent No.: US 11,493,113 B2
(45) Date of Patent: Nov. 8, 2022

(54) DRIVE BELT TENSIONER SYSTEMS AND METHODS

(71) Applicant: Johnson Controls Technology Company, Auburn Hills, MI (US)

(72) Inventors: Ravindra B. Salunkhe, Satara (IN); Siddappa R. Bidari, Pune (IN); Praveen Y R, Davanagere (IN); Kunal J. Gandevia, Pune (IN); Kevin D. Buller, Norman, OK (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 292 days.

(21) Appl. No.: 16/595,232

(22) Filed: Oct. 7, 2019

(65) Prior Publication Data

US 2020/0340554 A1 Oct. 29, 2020

Related U.S. Application Data

(60) Provisional application No. 62/838,860, filed on Apr. 25, 2019.

(51) Int. Cl.
| | |
|---|---|
| *F04D 25/08* | (2006.01) |
| *F16H 7/12* | (2006.01) |
| *F04D 25/02* | (2006.01) |
| *F24F 7/007* | (2006.01) |
| *F04D 29/40* | (2006.01) |
| *F16H 7/08* | (2006.01) |

(52) U.S. Cl.
CPC .......... *F16H 7/1281* (2013.01); *F04D 25/02* (2013.01); *F04D 29/403* (2013.01); *F24F 7/007* (2013.01); *F16H 7/1209* (2013.01); *F16H 2007/088* (2013.01)

(58) Field of Classification Search
CPC ...... F04D 25/08; F04D 29/4226; F04D 25/02; F04D 29/403; F16H 7/1281; F16H 2007/088; F05D 2260/4021
See application file for complete search history.

(56) References Cited

U.S. PATENT DOCUMENTS

| | | | | |
|---|---|---|---|---|
| 660,570 | A * | 10/1900 | Green | F16H 7/1281 |
| | | | | 474/135 |
| 2,631,776 | A * | 3/1953 | Palmer | F04D 29/424 |
| | | | | 415/214.1 |
| 3,142,193 | A * | 7/1964 | Polko | F16H 7/1281 |
| | | | | 474/110 |
| 3,353,420 | A * | 11/1967 | Rivers | F16H 7/1281 |
| | | | | 474/133 |
| 4,551,120 | A | 11/1985 | Thomey | |
| 4,767,383 | A * | 8/1988 | St. John | F16H 7/1281 |
| | | | | 474/111 |

(Continued)

*Primary Examiner* — Ninh H. Nguyen
(74) *Attorney, Agent, or Firm* — Fletcher Yoder, P.C.

(57) ABSTRACT

Embodiments of the present disclosure include a drive belt tensioner configured to adjust tension in a drive belt of a blower assembly for a heating, ventilation, and/or air conditioning (HVAC) system. The drive belt tensioner includes a mounting bracket configured to couple directly to a blower housing that is configured to house a blower of the blower assembly. The drive belt tensioner further includes an idler pulley configured to contact the drive belt. A position of the idler pulley is adjustable relative to the mounting bracket to enable adjustment of the tension in the drive belt.

18 Claims, 19 Drawing Sheets

(56) References Cited

U.S. PATENT DOCUMENTS

| | | |
|---|---|---|
| 5,242,331 A | 9/1993 | Konig |
| 5,277,666 A | 1/1994 | Kumm |
| 5,370,586 A | 12/1994 | Thomsen et al. |
| 5,738,167 A * | 4/1998 | Asbjornson ............. F24F 13/20 165/122 |
| 6,090,001 A * | 7/2000 | Cantwell ............... F16H 7/1281 474/135 |
| 6,422,963 B2 | 7/2002 | Kurose |
| 8,287,410 B2 | 10/2012 | Schmid et al. |
| 2010/0137083 A1 | 6/2010 | Carlson |
| 2011/0294614 A1* | 12/2011 | Bigler ................... F16H 7/1281 474/133 |
| 2014/0213400 A1 | 7/2014 | Hallen |
| 2016/0091064 A1 | 3/2016 | Aubertin et al. |

* cited by examiner

DRIVE BELT TENSIONER SYSTEMS AND METHODS

CROSS-REFERENCE TO RELATED APPLICATIONS

This application claims priority from and the benefit of U.S. Provisional Application Ser. No. 62/838,860, entitled "DRIVE BELT TENSIONER SYSTEMS AND METHODS", filed Apr. 25, 2019, which is herein incorporated by reference in its entirety for all purposes.

BACKGROUND

The present disclosure relates generally to heating, ventilation, and/or air conditioning (HVAC) systems and, more particularly, to systems and methods for adjusting tension in a drive belt of HVAC systems.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

A wide range of applications exist for HVAC systems. For example, residential, light commercial, commercial, and industrial systems are used to control temperatures and air quality in residences and buildings. Such systems may be dedicated to either heating or cooling, although systems are common that perform both of these functions. Very generally, these systems operate by implementing a thermal cycle in which fluids are heated and cooled to provide a desired temperature in a controlled space, such as the inside of a residence or a building. Generally, HVAC units may include a blower that is configured to drive air flow through the HVAC unit. The blower is typically powered by a motor. Particularly, the motor may transfer power to the blower via drive belt. At times, a tension of the drive belt may be adjusted.

SUMMARY

In one embodiment of the present disclosure, a belt tensioner for a blower assembly includes a mounting bracket configured to couple directly to the blower assembly and an idler arm configured to couple to the mounting bracket at a connection point and in an angular position relative to a base of the blower assembly. The angular position is adjustable about the connection point. The belt tensioner further includes an idler pulley coupled to the idler arm. The idler pulley is configured to engage with a drive belt of the blower assembly.

In another embodiment of the present disclosure, a heating, ventilation, and/or air conditioning (HVAC) system includes a blower assembly having a blower, a blower housing configured to house the blower, a motor configured to provide rotational power, and a drive belt configured to transfer the rotational power from the motor to the blower. The HVAC system further includes a belt tensioner having an L-shaped support with a first arm coupled to an idler pulley and a second arm. The first arm and the second arm are coupled to one another at a bend. The L-shaped support is rotatably coupled to the blower housing via a mounting bracket. The idler pulley is configured to contact the drive belt to facilitate tensioning of the drive belt.

In a further embodiment of the present disclosure, a blower assembly for a heating, ventilation, and/or air conditioning (HVAC) system includes a blower fan, a blower housing containing the blower fan, and a drive belt coupled to the blower fan and configured to drive rotation of the blower fan. The HVAC system further includes a belt tensioner having an L-shaped bracket that is coupled to the blower housing via a mounting bracket. The L-shaped bracket is rotatably coupled to the mounting bracket at a bend of the L-shaped bracket.

In a further embodiment of the present disclosure, a belt tensioner for a blower assembly includes a guide rail configured to couple directly to the blower assembly and an idler mounting plate configured to slide along the guide rail, such that a position of the idler mounting plate is linearly adjustable relative to the guide rail. The belt tensioner further includes an idler pulley coupled to the idler mounting plate. The idler pulley is configured to engage with a drive belt of the blower assembly.

In a further embodiment of the present disclosure, a heating, ventilation, and/or air conditioning (HVAC) system includes a blower assembly having a blower, a blower housing configured to house the blower, a motor configured to provide rotational power, and a drive belt configured to transfer the rotational power from the motor to the blower. The HVAC system further includes a belt tensioner having a guide rail configured to mount directly to the blower housing, an idler mounting plate configured to move linearly along the guide rail, an idler pulley configured to mount to the idler mounting plate, and a bolt configured to couple to the idler mounting plate and to a lock plate, such that rotation of the bolt linearly adjusts a position of the idler pulley relative to the drive belt.

In a further embodiment of the present disclosure a heating, ventilation, and/or air conditioning (HVAC) system includes a guide rail configured to couple directly to a blower housing of the HVAC system and an idler mounting plate configured to support an idler pulley and having a first hole disposed through a first flange of the idler mounting plate. The idler mounting plate is configured to slide along the guide rail to adjust a position of the idler pulley relative to a blower drive belt of the HVAC system. The HVAC system further includes a lock plate having a second hole disposed through a second flange of the lock plate. The lock plate is configured to couple directly to the blower housing. The HVAC system further includes a bolt configured to extend through the first hole of the first flange of the idler mounting plate and through the second hole of the second flange of the lock plate. Rotation of the bolt is configured to adjust a position of the idler mounting plate relative to the guide rail to adjust the position of the idler pulley.

In a further embodiment of the present disclosure, a belt tensioner for a blower assembly includes a mounting bracket configured to couple directly to the blower assembly, an idler arm configured to rotatably couple to the mounting bracket and having a first side and a second side, and an idler pulley rotatably coupled to the idler arm. The idler pulley is configured to engage with a drive belt of the blower assembly. The belt tensioner further includes a tension spring coupled to the mounting bracket and to the first side of the idler arm, and a compression spring coupled to the mounting bracket and to the second side of the idler arm.

In a further embodiment of the present disclosure a heating, ventilation, and/or air conditioning system includes a blower housing, a mounting bracket configured to mount to the blower housing, and an idler arm configured to rotatably couple to the mounting bracket. The HVAC system further includes a first linear spring configured to couple to a first side of the idler arm and to the mounting bracket, a second linear spring configured to couple to a second side of the idler arm and to the mounting bracket, and an idler pulley configured to couple to an end of the idler arm and to engage with a drive belt of the HVAC system.

In a further embodiment of the present disclosure a heating, ventilation, and/or air conditioning (HVAC) system includes a blower assembly having a blower, a blower housing configured to house the blower, a motor configured to provide rotational power, and a drive belt configured to transfer the rotational power from the motor to the blower. The HVAC system further includes a belt tensioner having a mounting bracket configured to mount directly to the blower housing, an idler arm configured to rotatably mount to the mounting bracket at a pivot point, an idler pulley configured to rotationally mount to an end of the idler arm distal to the pivot point, and a set of linear springs coupled between the idler arm and the mounting bracket. Each linear spring of the set of linear springs is configured to be linearly actuated in response to engagement between the idler pulley and the drive belt.

Other features and advantages of the present application will be apparent from the following, more detailed description of the embodiments, taken in conjunction with the accompanying drawings, which illustrate, by way of example, the principles of the application.

DRAWINGS

DETAILED DESCRIPTION

Figure 1:
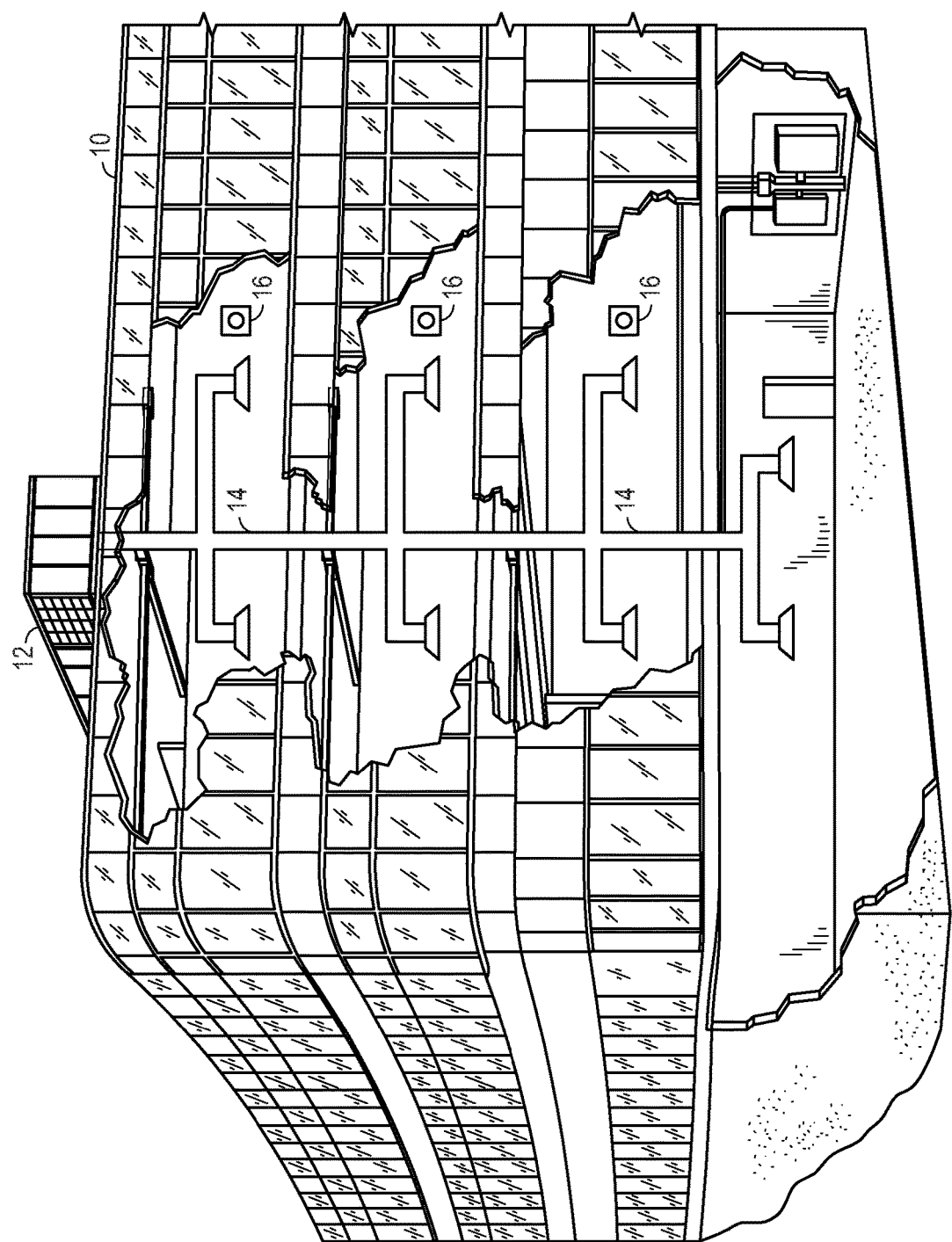
FIG. 1 is a perspective view of an embodiment of a heating, ventilation, and/or air conditioning (HVAC) system for building environmental management that may employ one or more HVAC units, in accordance with aspects of the present disclosure.

Certain heating, ventilation, and/or air conditioning (HVAC) systems may include a blower, or fan, configured to move air through the HVAC system. For example, a blower may be used to force air across a heat exchanger, such as an evaporator or a condenser. The blower may be powered by a motor, which may be configured to deliver power to the blower via a drive belt. That is, the drive belt may transfer rotational power from the motor to the blower to cause the blower to rotate and force an air flow through the HVAC system. The drive belt should be at a proper tension to efficiently transfer power from the motor to the blower. However, over time, the drive belt may become loose, such as due to stretching of the drive belt. In such instances, slippage of the belt relative to the motor and/or the blower may occur, which may cause inefficiencies in the HVAC system. Accordingly, it is desirable to occasionally tighten or increase a tension of the drive belt. Existing systems for tightening a drive belt of a blower assembly include a system for mounting the motor on a sliding platform. In such instances, when the drive belt begins to lose tension, the motor may be moved via the sliding platform to increase a distance between the blower and the motor, thereby tightening, or increasing a tension, of the drive belt. However, such adjustment assemblies may be difficult to access and to manipulate or maintain. Moreover, such adjustment assemblies may require many moving parts, which may cause unnecessary wear on some components.

Accordingly, the present disclosure is directed to an improved belt tensioner for a blower of an HVAC system. The belt tensioner may be mounted directly to a blower housing of the blower via a mounting bracket. An idler arm is rotatably coupled to the mounting bracket via a bolt or other coupling member, and the idler arm includes an idler pulley mounting portion coupled to an idler pulley. A drive belt of the blower assembly may extend about the idler pulley, and a tension in the drive belt may be based on a force applied to the drive belt by the idler pulley. Moreover, the force of the idler pulley on the drive belt may be adjusted through rotation of the idler arm. For example, the idler pulley mounting portion of the idler arm may include an L-shaped configuration rotatably mounted to the mounting bracket about a bend, or fulcrum, of the L-shaped configuration. As an angular position of the idler arm is adjusted, the force that the idler pulley applies to the drive belt is correspondingly adjusted. For example, rotation of the idler arm may cause the idler pulley to travel in a direction towards the drive belt, thereby increasing the force of the idler pulley on the drive belt and increasing a tension of the drive belt.

The angular position of the idler arm may be adjusted via an adjustment assembly. For example, in some embodiments, the belt tensioner may include an adjustment plate extending from the idler pulley mounting portion of the idler arm. Moreover, the adjustment assembly may include a bolt extending through the mounting bracket and through the adjustment plate. As the bolt is rotated, the bolt may cause the adjustment plate to be rotated, thereby adjusting the angular position of the idler arm, and correspondingly adjusting the tension of the drive belt. Further, in some embodiments, the adjustment assembly may include a bolt disposed through an arcuate slot of the L-shaped idler arm. The bolt may be loosened to allow the arcuate slot to move along the bolt, and thereby allowing rotational repositioning of the idler arm about the fulcrum.

In some embodiments, the improved belt tensioner may include a guide rail coupled directly to the blower housing, a lock plate coupled directly to the blower housing, and an idler mounting plate configured to slide within the guide rail and support an idler pulley configured to apply tension to the drive belt. The belt tensioner may further include a bolt or other adjustable component configured to extend between and couple to the lock plate and the idler mounting plate. Rotation of the bolt causes the idler mounting plate and the idler pulley to linearly translate relative to the blower housing and the drive belt to adjust a force that the idler pulley applies to the drive belt.

In some embodiments, the improved belt tensioner may include a set of springs coupled to sides of an idler arm. An idler pulley is coupled to a distal end of the idler arm and is configured to apply tension to the drive belt. As the drive belt provides a reactive load against the idler pulley, the set of springs may actuate to automatically adjust tension in the drive belt. Particularly, the belt tensioner may include a compression spring and a tension spring. The compression spring is configured to compress and the tensioner spring is configured to elongate in response to engagement between the idler pulley and the drive belt. The multi-spring configuration and action may enable an active distribution of the drive belt load between the springs, thereby increasing longevity of the springs, the belt tensioner, and the drive belt.

Accordingly, embodiments of the disclosed belt tensioner are configured to adjust a tension in the drive belt in an efficient and cost-effective manner and without adjustment to a position of the motor of the blower assembly.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56. The HVAC unit 12 is an air cooled device that implements a refrigeration cycle to provide conditioned air to the building 10. Specifically, the HVAC unit 12 may include one or more heat exchangers across which an airflow is passed to condition the airflow before the airflow is supplied to the building. In the illustrated embodiment, the HVAC unit 12 is a rooftop unit (RTU) that conditions a supply air stream, such as environmental air and/or a return airflow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
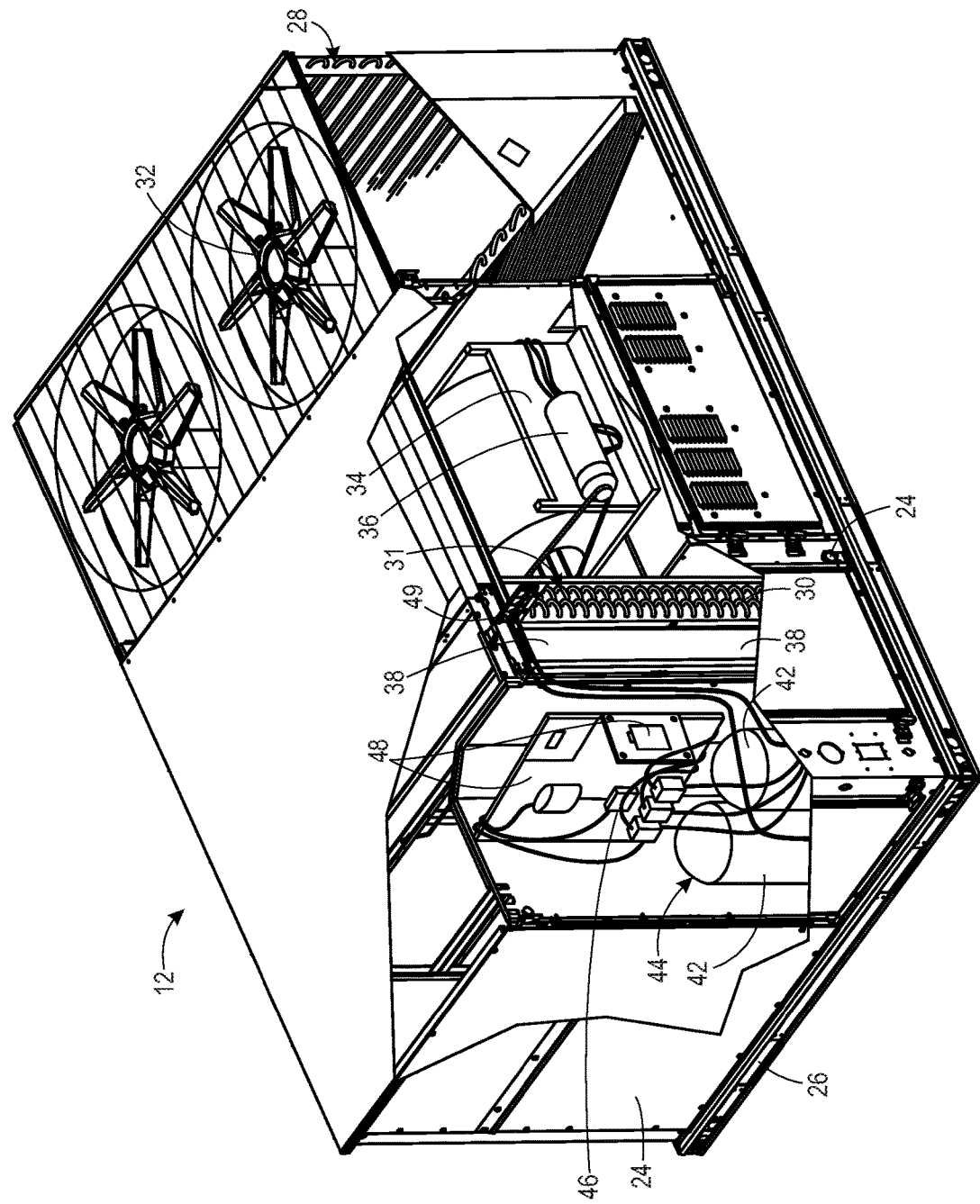
FIG. 2 is a perspective view of an embodiment of a packaged HVAC unit, in accordance with aspects of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant (for example, R-410A, steam, or water) through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the airflows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned airflows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms (one or more being referred to herein separately or collectively as the control device 16). The control circuitry may be configured to control operation of the equipment, provide alarms, and monitor safety switches. Wiring 49 may connect the control board 48 and the terminal block 46 to the equipment of the HVAC unit 12.

Figure 3:
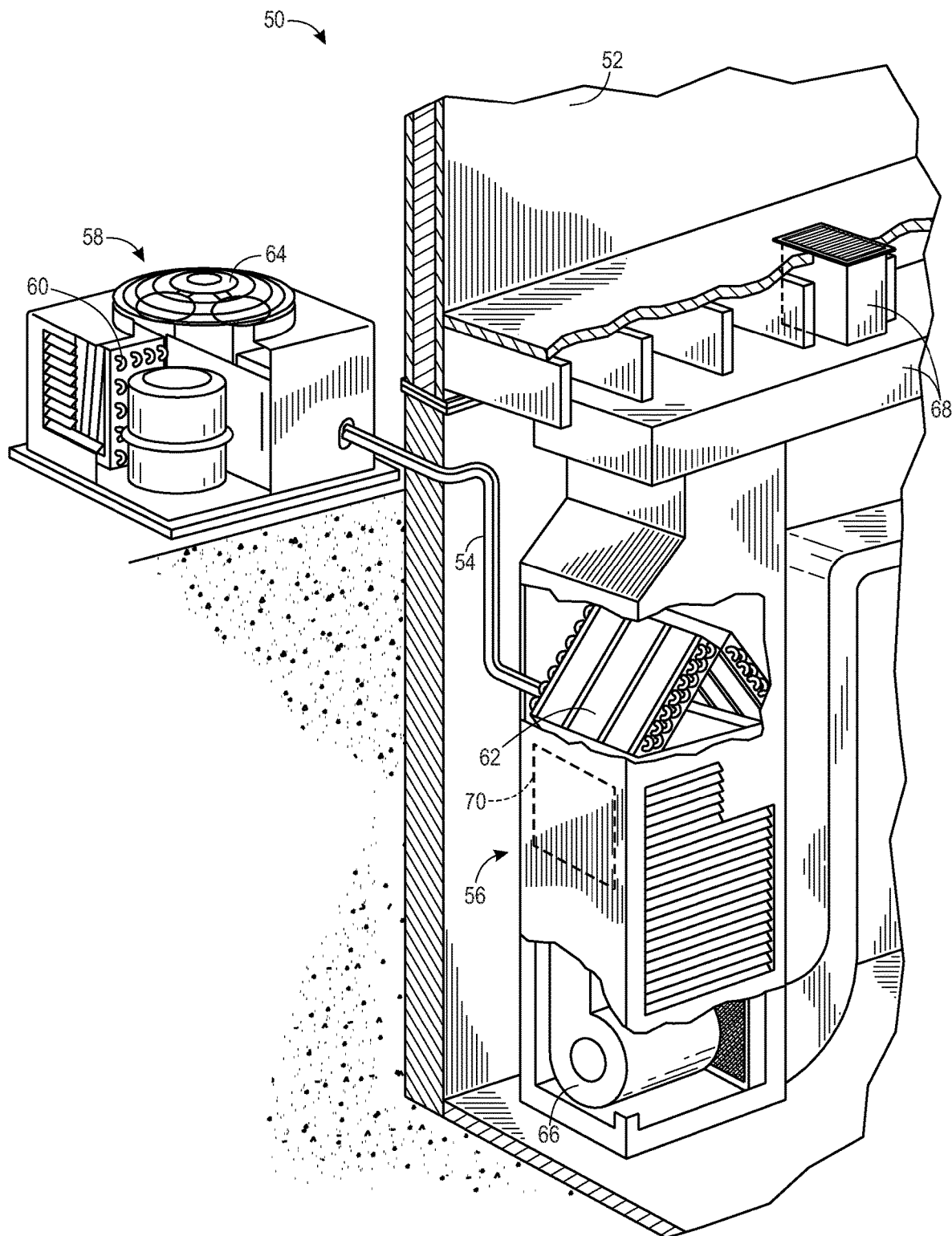
FIG. 3 is a perspective view of an embodiment of a residential split heating and cooling system, in accordance with aspects of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant (which may be expanded by an expansion device, not shown) and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat (plus a small amount), the residential heating and cooling system 50 may become operative to refrigerate additional air for circulation through the residence 52. When the temperature reaches the set point (minus a small amount), the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger (that is, separate from heat exchanger 62), such that air directed by the blower 66 passes over the tubes or pipes and extracts heat from the combustion products. The heated air may then be routed from the furnace system 70 to the ductwork 68 for heating the residence 52.

Figure 4:
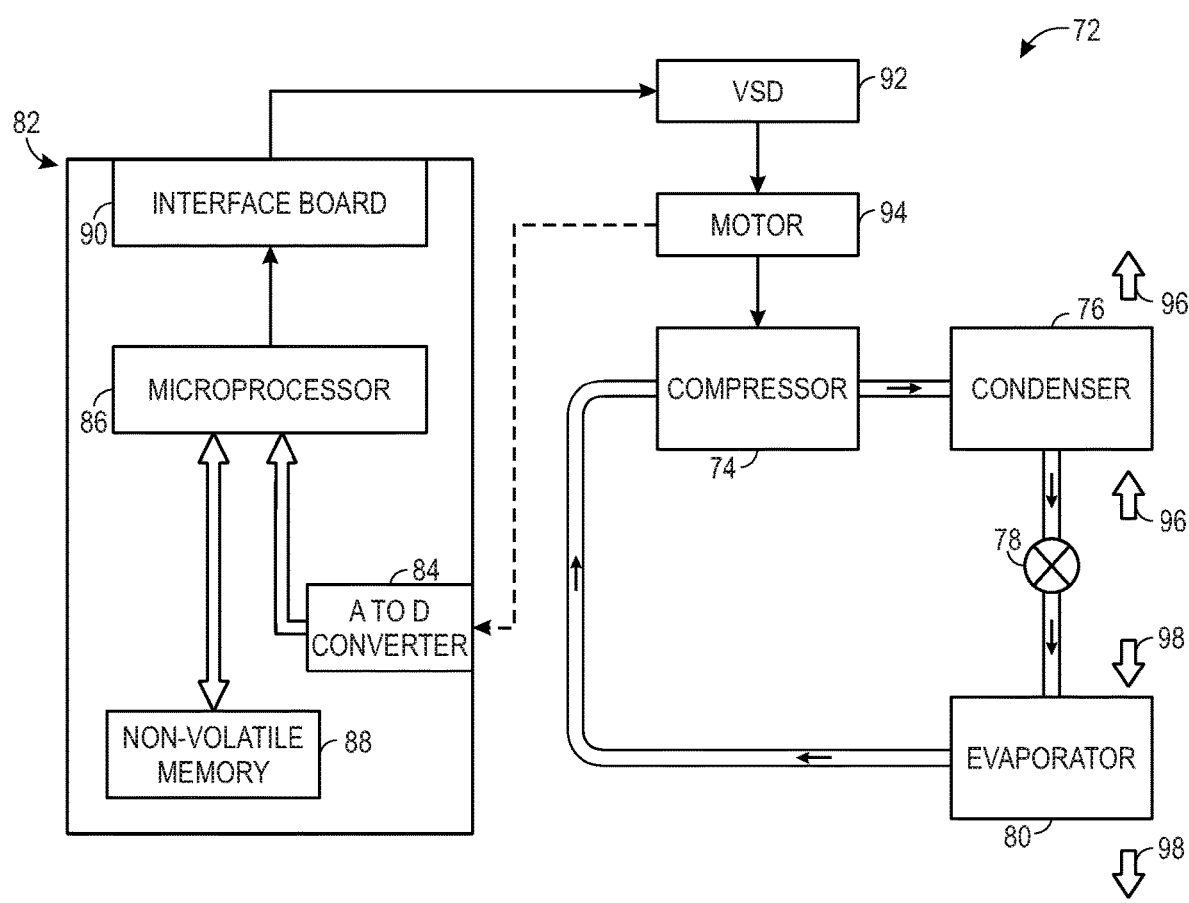
FIG. 4 is a schematic view of an embodiment of a vapor compression system that may be used in an HVAC system, in accordance with aspects of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

As discussed below, an HVAC system 100, such as the HVAC unit 12, the residential heating and cooling system 50, and/or the vapor compression system 72 may include a blower assembly 102 having a blower 104, such as the blower assembly 34 and/or the blower 66. The blower assembly 102 may be used to pass air over a heat exchanger, such as the heat exchangers 28, 30, 60, 62, the condenser 76, and/or the evaporator 80. In some embodiments, the blower assembly 102 may be utilized to provide conditioned air to a conditioned space after passing air over the heat exchanger, or may be utilized to expel air into the atmosphere. The blower assembly 102 further includes a motor 106, such as the motor 36, which is configured to power the blower 104. Particularly, the motor 106 transfers rotational power to the blower 102 via a drive belt 108. In some instances, the drive belt 108 may loosen over time, or lose tension. Accordingly, provided herein is a belt tensioner 114 configured to adjust a tension of the drive belt 108.

Figure 5:
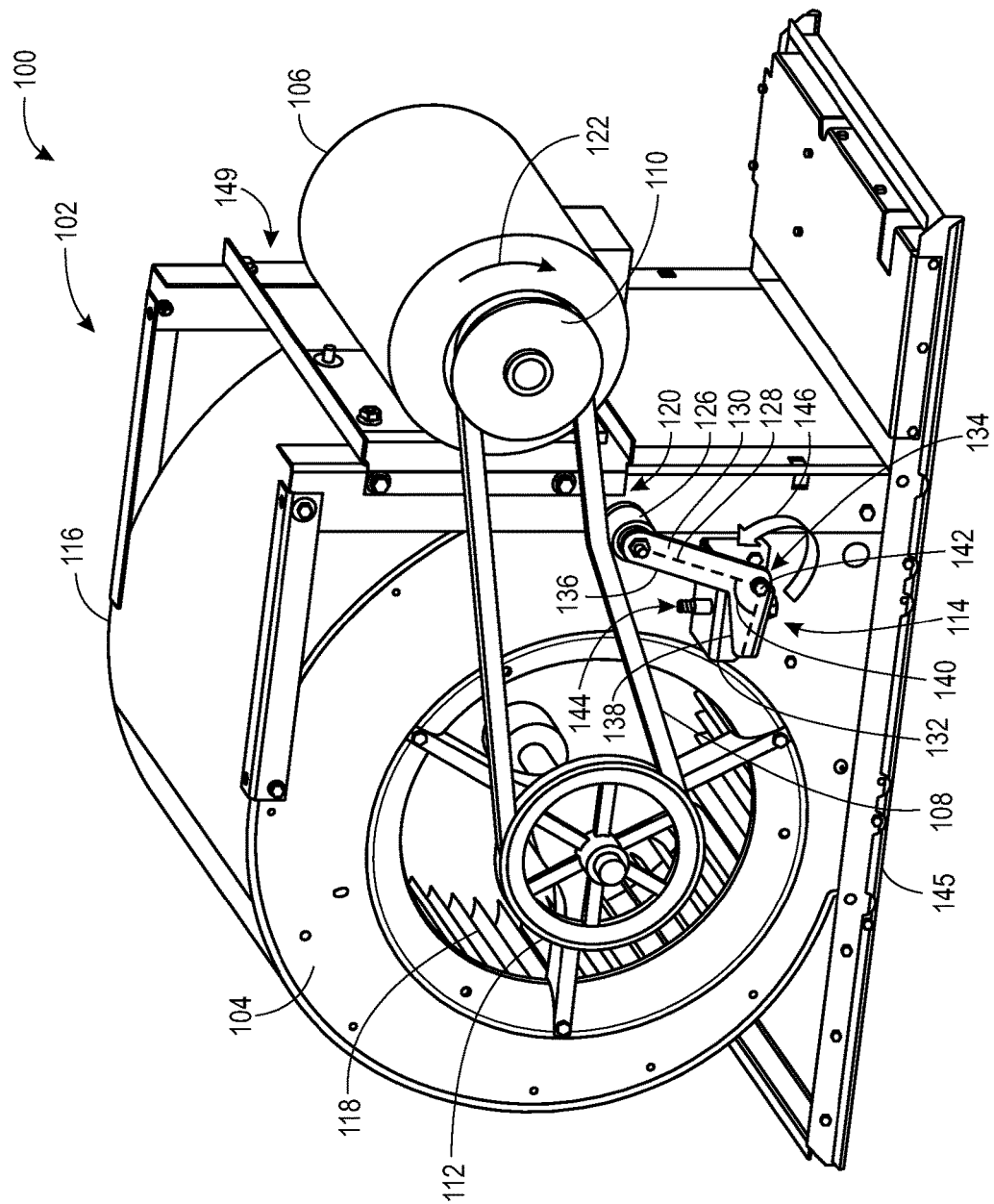
FIG. 5 is a perspective view of an embodiment of a blower assembly having a belt tensioner, in accordance with aspects of the present disclosure.

To illustrate, FIG. 5 is a perspective view of the blower assembly 102 of the HVAC system 100. As discussed above, the blower assembly 102 may be utilized to move air through the HVAC system 100, such as to provide conditioned air to a space. The blower assembly 102 includes the blower 104 and the motor 106. The motor 106 is configured to transfer rotational power to the blower 104 via the drive belt 108. More specifically, the motor 106 may cause a motor pulley 110 to rotate, thereby transferring power to the drive belt 108, which in turn drives rotation of a blower pulley 112 of the blower 104 to rotate and drive operation of the blower 104. The drive belt 108 may be a flat belt, a toothed belt, a V-belt, a multi-groove belt, or any other suitable belt or loop that drivingly links the motor pulley 110 and the blower pulley 112.

The blower assembly 102 further includes the belt tensioner 114 configured to adjust a tension of the drive belt 108. For example, in some embodiments, the drive belt 108 may be formed from a rubber, or other polymer, and may stretch or lose tension over time. Accordingly, the belt tensioner 114 may be utilized to increase or otherwise adjust a tension of the drive belt 108, thereby ensuring that the drive belt 108 is taught and adequately engaged with the motor pulley 110 and the blower pulley 112 to avoid slippage between the drive belt 108 and the motor pulley 110 and/or the blower pulley 112.

The belt tensioner 114 may be mounted directly to a blower housing 116 of the blower assembly 102. The blower housing 116 houses the blower 104 and components associated with the blower 104, such as a fan wheel 118, or a blower fan. The belt tensioner 114 is positioned on the blower housing 116 to be adjacent to a slack side 120 of the drive belt 108. For example, as illustrated, the motor 106 may cause the motor pulley 110 to rotate in a clockwise direction 122, thereby causing the top side of the drive belt 108 to be a tight side 124, which is in tension, and causing the bottom side of the drive belt 108 to be the slack side 120. The belt tensioner 114 is positioned adjacent to the slack side 120 to contact the drive belt 108 and selectively deflect the slack side 120 of the drive belt 108 to increase a tension of the drive belt 108 at a desired magnitude. Particularly, the belt tensioner 114 may include an idler pulley 126 configured to contact and deflect the drive belt 108. The idler pulley 126 is configured to freely rotate in response to the moving drive belt 108. Indeed, the idler pulley 126 may include an outer shell formed of plastic, or another suitable material, and may include a set of bearings configured to enable rotation of the outer shell in response to movement of the drive belt 108.

Further, the idler pulley 126 is coupled to an idler arm 128, such as an L-shaped support or L-shaped bracket, of the belt tensioner 114. The idler arm 128 may include an idler pulley mounting portion 130, which is substantially L-shaped, as shown. Specifically, the idler pulley mounting portion 130 is rotatably coupled to a mounting bracket 132 about a fulcrum 134, or bend, of the idler pulley mounting portion 130. Moreover, the idler pulley mounting portion 130 may include a first portion 136, or first leg, to which the idler pulley 126 is rotatably coupled, and a second portion 138, or second leg, disposed at an angle relative to the first portion 136 about the fulcrum 134. In other words, the first portion 136 and the second portion 138 may be disposed crosswise, or at an angle, relative to each other about the fulcrum 134. For example, in some embodiments, an interior angle 140 of the crosswise disposition between the first portion 136 and the second portion 138 may be approximately between 90° and 180°.

The belt tensioner 114 is coupled to the blower housing 116 via the mounting bracket 132. More specifically, the idler arm 128 is rotatably coupled to the mounting bracket 132 via a fulcrum fastener 142 disposed through the fulcrum 134, or point of rotation, or connection point, of the idler arm 128. The idler arm 128 is also coupled to the mounting bracket 132 via an adjustment assembly 144, or angular adjuster. The adjustment assembly 144 is configured to adjust an angular position of the idler pulley 126 relative to a base 145 of the blower assembly 102 in order to adjust the tension in the drive belt 108. To illustrate, the adjustment assembly 144 is coupled to the second portion 138 of the idler arm 128. Accordingly, as discussed in further detail below, the adjustment assembly 144 is configured to be operated to adjust a position of the second portion 138, thereby causing the angular position of the first portion 136 and the idler pulley 126 to be similarly adjusted. For example, in certain embodiments, the adjustment assembly 144 may provide a downward force on the second portion 138, thereby causing the idler pulley 126 to rotate in the counter-clockwise direction 146. Therefore, the idler pulley 126, which is coupled to an end of the first portion 136, is similarly moved in the counter-clockwise direction 146 towards the drive belt 108, thereby increasing a force on the drive belt 108 and correspondingly increasing a tension of the drive belt 108.

Further, as shown and in certain embodiments, the motor 106 may be mounted to the blower housing 116 via a motor support 149 of the blower housing 116. Particularly, the motor 106 may be rigidly coupled to the motor support 149, which in turn is rigidly coupled to the blower housing 116. In other words, the motor 106 may be held stationary relative to the blower housing 116 without components to adjust a position of the motor 106 relative to the blower 104. In this manner, the blower housing 116 and the motor 106 may be coupled with static, or stationary, components that are resistant to degradation, loosening, and/or wear, thereby extending an operational life of the blower assembly 102.

Figure 6:
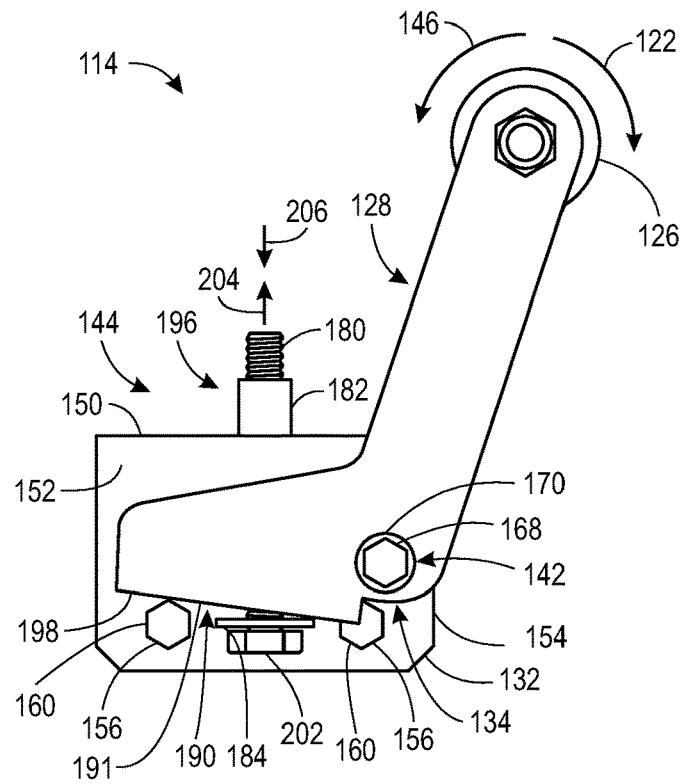
FIG. 6 is a front view of an embodiment of a belt tensioner, in accordance with aspects of the present disclosure.
Figure 7:
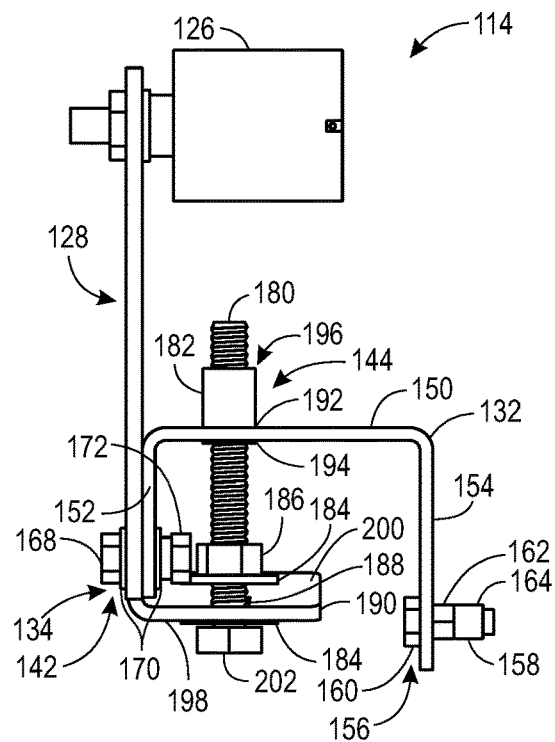
FIG. 7 is a side view of an embodiment of a belt tensioner, in accordance with aspects of the present disclosure.
Figure 8:
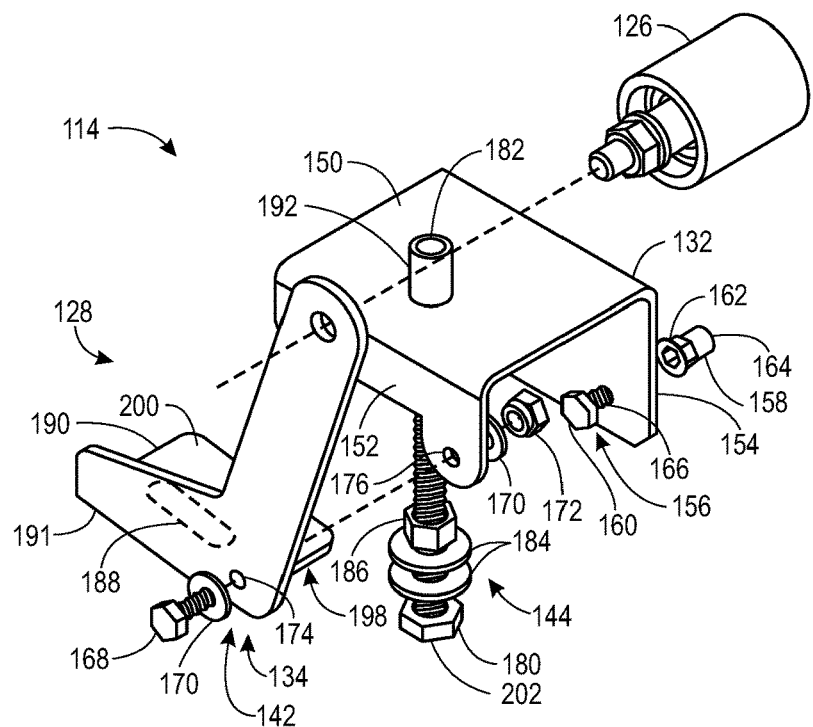
FIG. 8 is an exploded perspective view of an embodiment of a belt tensioner, in accordance with aspects of the present disclosure.

The following discussion references FIGS. 6, 7, and 8, which show various views of the belt tensioner 114. Specifically, FIG. 6 is a front view of the belt tensioner 114, FIG. 7 is a side view of the belt tensioner 114, and FIG. 7 is an exploded perspective view of the belt tensioner 114. As discussed above, the belt tensioner 114 includes the mounting bracket 132, the idler pulley 126, the idler arm 128, and the adjustment assembly 144.

The mounting bracket 132 includes a top portion 150, an outer portion 152, and an inner portion 154. The inner portion 154 and the outer portion 152 may be substantially parallel to each other and may both be substantially perpendicular to the top portion 150, as shown. Further, the mounting bracket 132 may be coupled to the blower housing 116 via one or more mounting fasteners 156. For example, as presently illustrated, the mounting bracket 132 includes two mounting fasteners 156. Each mounting fastener 156 may include a hex rivet nut 158 and a mounting bolt 160. In some embodiments, the blower housing 116 may include an aperture corresponding to each mounting fastener 156. Particularly, the aperture may be a hexagon-shaped aperture configured to receive the hex rivet nut 158. For example, the hex rivet nut 158 may be a rivet whereby a first end 162 of the hex rivet nut 158 includes a lip, or head, configured to abut against a surface of the blower housing 116, while a second end 164 of the hex rivet nut 158 is configured to be set, or peened, to create a ridge, or head, to abut against an opposite surface of the blower housing 116 once the hex rivet nut 158 is inserted within the aperture of the blower housing 116. The mounting bolt 160 may then be inserted through a mounting aperture 166 disposed through the inner portion 154 of the mounting bracket 132 to rigidly couple the mounting bracket 132 to the blower housing 116.

As mentioned above, the idler pulley 126 and the idler arm 128 may be coupled to the mounting bracket 132 via the fulcrum fastener 142. Particularly, as shown, the fulcrum fastener 142 may include a bolt 168, a set of washers 170, and a nut 172. The bolt 168 may extend through a fulcrum aperture 174 extending through the fulcrum 134 of the idler pulley 126 and through a rotational aperture 176 extending through the outer portion 152 of the mounting bracket 132. The nut 172 may couple to the bolt 168 to hold the bolt 168 within the fulcrum aperture 174 and the rotational aperture 176, thereby coupling the idler pulley 126 and the idler arm 128 to the mounting bracket 132. As will be appreciated, the fulcrum fastener 142 may couple the idler pulley 126 and the idler arm 128 to the mounting bracket 132 to allow rotation of the idler pulley 126 and the idler arm 128 about the fulcrum aperture 174 and the rotational aperture 176. Indeed, in some embodiments, the fulcrum fastener 142 may loosely couple the idler arm 128 to the mounting bracket 132 so as to impart minimal friction and allow the rotation of the idler arm 128.

The idler arm 128 may further be coupled to the mounting bracket 132 via the adjustment assembly 144. The adjustment assembly 144 may include an adjustment bolt 180, or threaded bolt, a hex rivet nut 182, a set of washers 184, and a locking nut 186. The adjustment bolt 180 may extend through a slot 188, such as an elongated aperture or slot, disposed through an adjustment plate 190 of the idler arm 128. Particularly, the adjustment plate 190 may extend crosswise, such as substantially perpendicularly, from an edge 191 of the second portion 138 of the idler arm 128 toward the inner portion 154 of the mounting bracket 132. Indeed, the idler pulley mounting portion 130 of the idler arm 128 may be integrally formed with the adjustment plate 190 as one piece, such as through bending or welding.

The adjustment bolt 180 may further extend through the hex rivet nut 182, which disposed within an aperture 192 within the top portion 150 of the mounting bracket 132. The hex rivet nut 182 may be similar to the hex rivet nut 158 described above in that a first end 194 of the hex rivet nut 182 includes a lip, or head, configured to abut against a surface of the top portion 150, while a second end 196 of the hex rivet nut 182 is configured to be set, or peened, to create a ridge, or head, to abut against an opposite surface of the top portion 150 once the hex rivet nut 182 is inserted within the aperture 192 of the top portion 150. Further, the aperture 192 formed in the top portion 150 may be correspondingly hexagon-shaped, thereby preventing rotation of the hex rivet nut 182 within the aperture 192. The set of washers 184 may be disposed along the adjustment bolt 180 and on opposite sides of the adjustment plate 190, as shown. For example, a first washer of the set of washers 184 may contact an exterior side 198 of the adjustment plate 190, and a second washer of the set of washers 184 may contact an interior surface 200 of the adjustment plate 190. Further, the locking nut 186 may be disposed adjacent to the second washer and along the adjustment bolt 180. Accordingly, the locking nut 186 may be torqued along the adjustment bolt 180 towards a bolt head 202 of the adjustment bolt 180 to capture the washers 184 and adjustment plate 190 between the locking nut 186 and the bolt head 202. In this manner, the adjustment bolt 180 and the adjustment plate 190 of the idler arm 128 are held in a fixed position relative to one another, thereby locking the angular orientation of the idler arm 128.

In operation, rotation of the adjustment bolt 180 about a longitudinal axis of the adjustment bolt 180 may cause the idler pulley 126 to increase or decrease tension on the drive belt 108, depending on the direction of rotation of the adjustment bolt 180. For example, as most clearly seen in FIG. 6, rotating the adjustment bolt 180 to thread the adjustment bolt 180 further into the hex rivet nut 182, as indicated by arrow 204, causes the adjustment bolt 180 to impart the clockwise rotation 122 on the idler pulley 126 via the adjustment plate 190 and the idler arm 128. Correspondingly, rotating the adjustment bolt 180 to thread the adjustment bolt 180 further out of the hex rivet nut 182, as indicated by arrow 206, causes the adjustment bolt 180 to impart a counter-clockwise rotation 146 on the idler pulley 126 via the adjustment plate 190 and the idler arm 128.

In some embodiments, as the adjustment bolt 180 and the idler pulley 126 are adjusted, the adjustment bolt 180 may move within the slot 188 of the adjustment plate 190. In other words, the adjustment plate 190 may move relative to the adjustment bolt 180 via the slot 188 having the adjustment bolt 180 extending therethrough. For example, during rotation of the idler pulley 126 and the idler arm 128 in the clockwise direction 122, the position of the adjustment bolt 180 is adjusted within the slot 188 in a direction toward the fulcrum 134. Similarly, during rotation of the idler pulley 126 and the idler arm 128 in the counter-clockwise direction 146, the position of the adjustment bolt 180 is adjusted within the slot 188 in a direction away from the fulcrum 134. Indeed, the movement of the adjustment bolt 180 within the slot 188 may be caused at least in part by the linear movement of the adjustment bolt 180 relative to the rotational motion of the idler arm 128. Moreover, in certain embodiments, the locking nut 186 may be loosened, such as torqued away from the bolt head 202, prior to adjustment of the idler arm 128 to enable the movement of the adjustment bolt 180 within the slot 188. Once the adjustment bolt 180 and the idler arm 128 have been adjusted to a desired orientation, the locking nut 186 may be tightened, such as torqued toward the bolt head 202, to secure the idler arm 128 in a stationary position relative to the adjustment bolt 180.

As shown above in FIG. 5 and described above, the clockwise rotation 122 of the idler arm 128 may cause the idler pulley 126 to decrease a force on the drive belt 108, and a counter-clockwise rotation 146 of the idler arm 128 may cause the idler pulley 126 to increase a force on the drive belt 108. However, it should be understood that the clockwise 122 and counter-clockwise 146 directions may optionally increase or decrease a force on the drive belt 108, depending on an orientation and position of the belt tensioner 114 relative to the drive belt 108. For example, in some embodiments, the belt tensioner 114 may be disposed approximately 90 counter-clockwise 146 from its currently illustrated position in FIG. 5. In such embodiments, clockwise rotation 122 of the idler arm 128 may cause the idler pulley 126 to increase a force on the drive belt 108, and counter-clockwise rotation 146 of the idler arm 128 may cause the idler pulley 126 to decrease a force on the drive belt 108. Indeed, it is to be understood that the belt tensioner 114 may be oriented and positioned at any suitable orientation and position relative to the drive belt 108, which, in some embodiments, may change an operation of the belt tensioner 114, as described above. However, in such alternative embodiments, the belt tensioner 114 may still be secured to the blower housing 116 or other stationary component of the blower assembly 102 to enable tension adjustment of the drive belt 108 without adjustment of the motor 106 or blower 104 relative to one another. In this manner, embodiments of the belt tensioner 114 disclosed herein enable a more simple, efficient, and convenient adjustment of tension in the drive belt 108.

Figure 9:
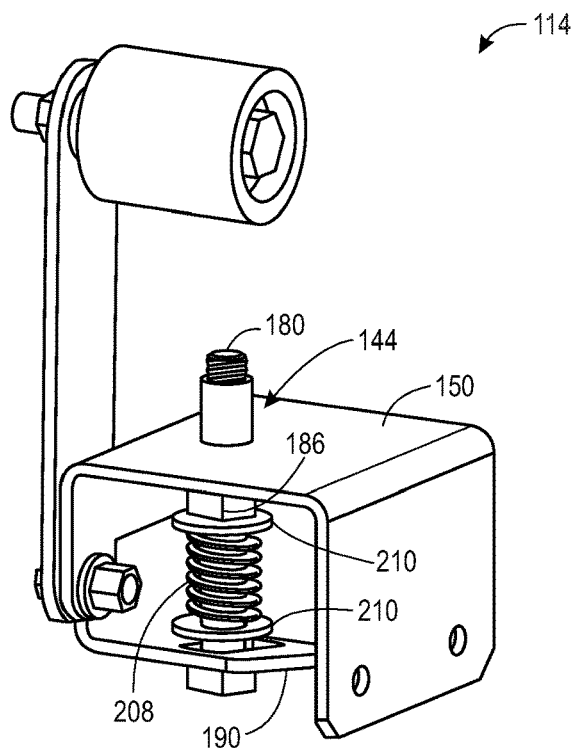
FIG. 9 is a perspective view of an embodiment of a belt tensioner, in accordance with aspects of the present disclosure.

In some embodiments, the belt tensioner 114 may experience a jerk, or sudden and momentary force, from the drive belt 108, such as when the blower assembly 102 commences operation. Accordingly, FIG. 9 is a perspective view of an embodiment of the belt tensioner 114, which includes a spring 208 to enable deflection of the idler arm 128 in response to the initial jerk or movement of the drive belt 108. In this manner, an operational life of the drive belt 108 may be extended. For example, as shown in the illustrated embodiment, the spring 208 may be disposed about the adjustment bolt 180 of the adjustment assembly 144. More specifically, the spring 208 may be disposed along the adjustment bolt 180 in between the locking nut 186 and the adjustment plate 190 of the idler arm 128. As shown, the adjustment assembly 144 may further include respective washers 210 directly adjacent to both longitudinal ends of the spring 208 along the adjustment bolt 180. In operation, when the idler pulley 126 of the idler arm 128 is in contact with the drive belt 108, the drive belt 108 may impart a force on the idler pulley 126. The force experienced by the idler pulley 126 may cause the idler arm 128 to rotate, as described above. Accordingly, the rotation of the idler arm 128 may cause the adjustment plate 190 to move generally toward the top portion 150 of the mounting bracket 132, thereby causing the spring 208 to compress to absorb some of the force imparted by the drive belt 108. In other words, the spring 208 may bias the adjustment plate 190 away from the mounting bracket 132. In this manner, the force of the initial jerk or movement of the drive belt 108 may be transferred to the spring 208, as opposed to a stationary object that may not absorb the force as readily, thereby increasing the operational life of the drive belt 108. Moreover, during general operation of the blower assembly 102, the drive belt 108 may experience fluctuations or inconsistencies in a movement of the drive belt 108 along the motor pulley 110 and/or the blower pulley 112. For example, the drive belt 108 may vibrate while in operation. Accordingly, the spring 208 may similarly absorb forces of the fluctuations of the drive belt 108, thereby extending an operational life of the drive belt 108.

As mentioned above, the adjustment plate 190 of the idler arm 128 may travel along different motion paths relative to the adjustment bolt 180 of the adjustment assembly 144. Specifically, the adjustment plate 190 may move relative to the adjustment bolt 180 along a substantially circular path, while the adjustment bolt 180 may move relative to the adjustment plate 190 along a substantially linear path. Indeed, as described above, the adjustment bolt 180 may be rotated, or threaded/unthreaded relative to the hex rivet nut 182, to be linearly displaced and cause the idler arm 128 to rotate. In some embodiments, the disparate motions paths of the adjustment bolt 180 and the adjustment plate 190 may cause the adjustment bolt 180 and/or the adjustment plate 190 to experience a bending moment or force.

Figure 10:
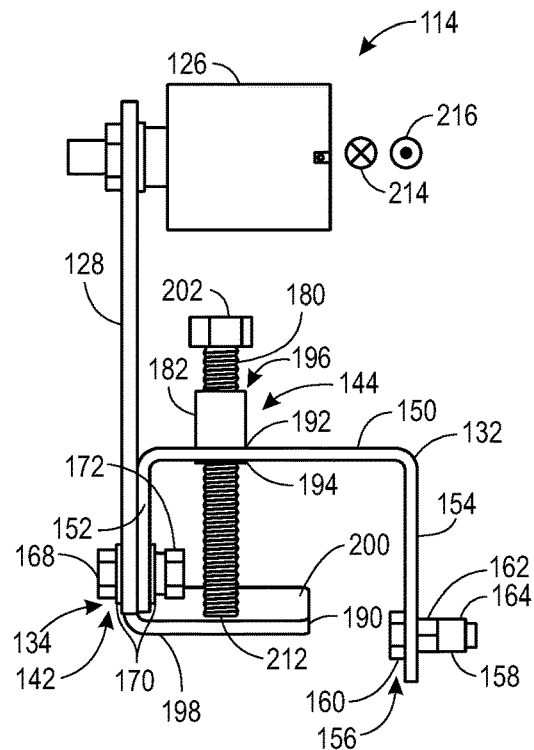
FIG. 10 is a side view of an embodiment of a belt tensioner, in accordance with aspects of the present disclosure.

Accordingly, in certain embodiments and as shown in FIG. 10, the adjustment bolt 180 may abut the interior surface 200 of the adjustment plate 190 of the idler arm 128. In this manner, the adjustment plate 190 and/or the adjustment bolt 180 may not experience the bending moment during operation, as described above. In other words, a bending force may not transfer between the adjustment plate 190 and the adjustment bolt 180. For example, in the illustrated embodiment, the bolt head 202 of the adjustment bolt 180 may be disposed external to the top portion 150 of the mounting bracket 132 and the hex rivet nut 182. Further, the adjustment plate 190 of the idler arm 128 may be substantially solid, such as without the slot 188 shown in FIGS. 6-9. In this manner, a distal end 212 of the adjustment bolt 180 may abut, and apply a force, on the interior surface 200 of the adjustment plate 190 when the idler pulley 126 is in contact with the drive belt 108. In this manner, rotation of the adjustment bolt 180 about the longitudinal axis of the adjustment bolt 180 to thread the adjustment bolt 180 further into the hex rivet nut 182, which causes the adjustment bolt 180 to travel towards the adjustment plate 190, may cause the idler pulley 126, to travel generally in a direction into the page, as denoted by the vector symbol 214. Correspondingly, rotation of the adjustment bolt 180 about the longitudinal axis of the adjustment bolt 180 to unthread the adjustment bolt 180 out of the hex rivet nut 182, which causes the adjustment bolt 180 to retract away from the adjustment plate 190, may allow the drive belt 108 to force the idler pulley 126 to travel generally in a direction out of the page, as denoted by the vector symbol 216.

Figure 11:
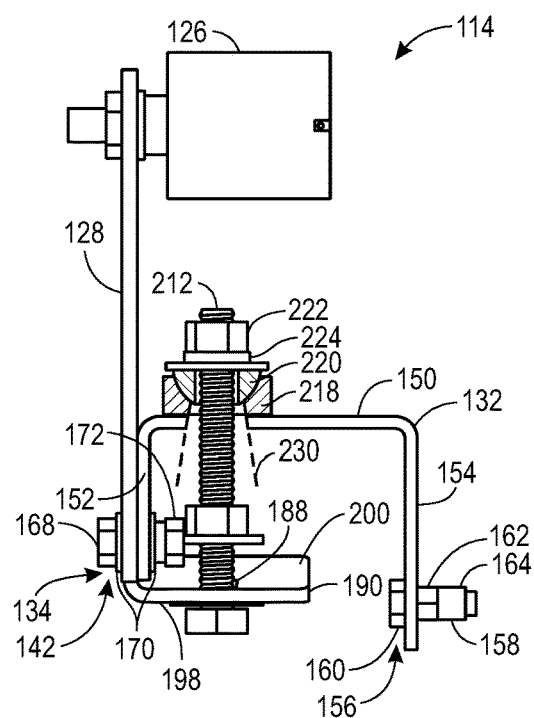
FIG. 11 is a side view of an embodiment of a belt tensioner, in accordance with aspects of the present disclosure.

Further, in certain embodiments and as shown in FIG. 11, the adjustment assembly 144 may include a hemispherical cup 218 and a hemispherical washer 220 to enable adjustment of an angular position of the adjustment bolt 180 relative to the hemispherical cup 218 and relative to the mounting bracket 132. Indeed, it should be understood that, in some embodiments, the hemispherical cup 218 and the hemispherical washer 220 may generally be curved, such as having a degree of curvature that is more or less than a hemisphere of a sphere. As shown in FIG. 11, the adjustment assembly 144 may further include a nut 222 and a washer 224 disposed along the adjustment bolt 180 between the distal end 212 of the adjustment bolt 180 and the hemispherical washer 220. First, it should be noted that the hemispherical washer 220 and the hemispherical cup 218 are both illustrated as cross-sectional views. Indeed, it should be understood that both the hemispherical washer 220 and the hemispherical cup 218 may extend 360 degrees about the adjustment bolt 180. In this manner, the adjustment plate 190 and/or the adjustment bolt 180 may not experience a bending moment during operation, as described above.

Further, as also described above with reference to FIGS. 6-8, when the belt tensioner 114 is adjusted, the adjustment bolt 180 may relatively move within the slot 188 formed in the adjustment plate 190 of the idler arm 128. Moreover, in the embodiments of FIGS. 6-8, as the adjustment bolt 180 relatively moves within the slot 188, the adjustment bolt 180 may be disposed at an angle, such as greater than or less than 90 degrees relative to the interior surface 200 of the adjustment plate 190. This may cause an inefficient application of forces because the adjustment bolt 180 may apply a force at an angle relative to the tangential direction of the rotational motion of the adjustment plate 190. In the illustrated embodiment of FIG. 11, however, the hemispherical cup 218 and the hemispherical washer 220 may enable the adjustment bolt 180 to be angularly displaced in conjunction with rotational motion of the adjustment plate 190. In this manner, the adjustment bolt 180 may rotate with the adjustment plate 190 and the idler arm 128, such that the adjustment bolt 180 may be disposed normal to the interior surface 200 of the adjustment plate 190. Particularly, in certain embodiments, a curvature of the hemispherical washer 220 may substantially match a curvature of the hemispherical cup 218. In this manner, the hemispherical washer 220 and the adjustment bolt 180 may move in conjunction relative to the hemispherical cup 218, thereby enabling the adjustment bolt 180 to move within a conical area 230 of motion. The conical area 230 of motion may have an angle of approximately 15 degrees, for example, or any other suitable angle relative to a vertex of the conical area 230. The normal or perpendicular orientation of the adjustment bolt 180 relative to the interior surface 200 of the adjustment plate 190 may enable the adjustment bolt 180 to apply a force in the tangential direction of the rotational motion of the adjustment plate 190, thereby enabling efficient application of force to the idler arm 128 to adjust or maintain the orientation of the idler arm 128.

Figure 12:
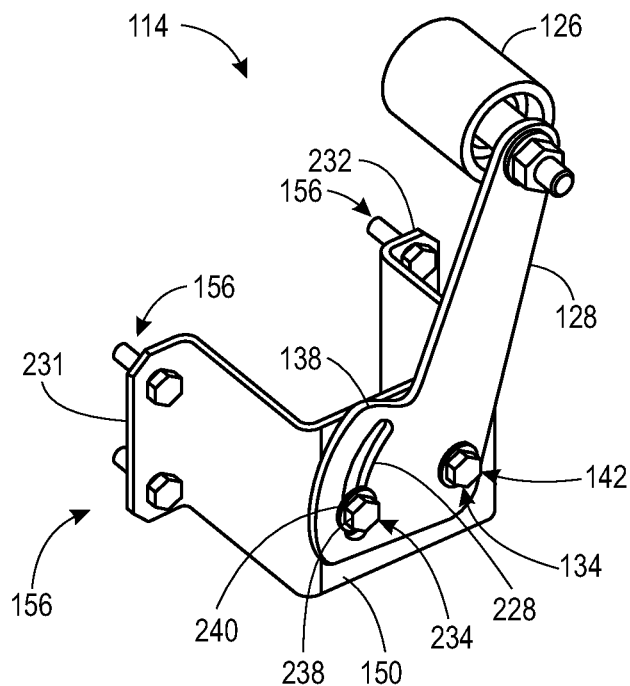
FIG. 12 is a perspective view of an embodiment of a belt tensioner, in accordance with aspects of the present disclosure.
Figure 13:
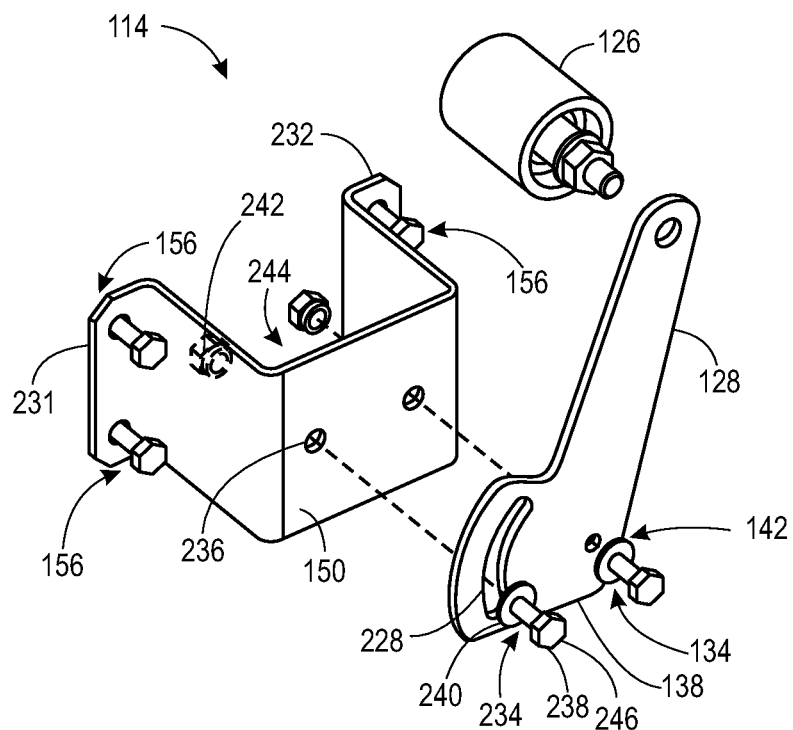
FIG. 13 is an exploded perspective view of an embodiment of a belt tensioner, in accordance with aspects of the present disclosure.

Additionally, in some embodiments, the belt tensioner 114 may include an arcuate slot 228 to enable adjustment of the idler arm 128, the idler pulley 126, and the tension of the drive belt 108. For example, as shown in FIGS. 12 and 13, the belt tensioner 114 may include the arcuate slot 228 in the second portion 138 of the idler arm 128 to enable rotational adjustment of the idler arm 128 relative to the mounting bracket 132. The mounting bracket 132 may be coupled to the blower housing 116 via the mounting fasteners 156, as described above. Specifically, in the illustrated embodiment of FIG. 12, the mounting bracket 132 includes a first mounting adjustment flange 231 and a second mounting adjustment flange 232, each configured to receive two mounting fasteners 156 to couple the first mounting adjustment flange 231 and the second mounting adjustment flange 232 to the blower housing 116. Moreover, similar to the embodiments discussed above, the idler arm 128 may be coupled to the top portion 150 of the mounting bracket 132 via the fulcrum fastener 142 extending through the fulcrum 134 of the idler arm 128.

In the illustrated embodiments of FIGS. 12 and 13, the adjustment assembly 144 includes an arcuate slot fastener 234 extending through the arcuate slot 228 of the second portion 138 of the idler arm 128. The arcuate slot fastener 234 extends through the arcuate slot 228 and through an aperture 236 formed in the top portion 150 of the mounting bracket 132. The arcuate slot fastener 234 includes a bolt 238, a washer 240, and a nut 242. The nut 242 may be coupled to the bolt 238 on an interior side 244 of the mounting bracket 132. The washer 240 may be disposed along the bolt 238 in between the bolt head 246 and the top portion 150 of the mounting bracket 132. In operation, the arcuate slot fastener 234 may be loosened, such as through rotation of the nut 242. Once the arcuate slot fastener 234 is loosened, the idler arm 128 may be rotated about the fulcrum 134, such as via direct manipulation of the idler arm 128. Once the idler arm 128 is at a desired position, or angular orientation, the arcuate slot fastener 234 may be tightened, thereby capturing the second portion 138 of the idler arm 128 and the top portion 150 of the mounting bracket 132 and holding the idler arm 128 and the idler pulley 126 in the desired angular orientation.

Figure 14:
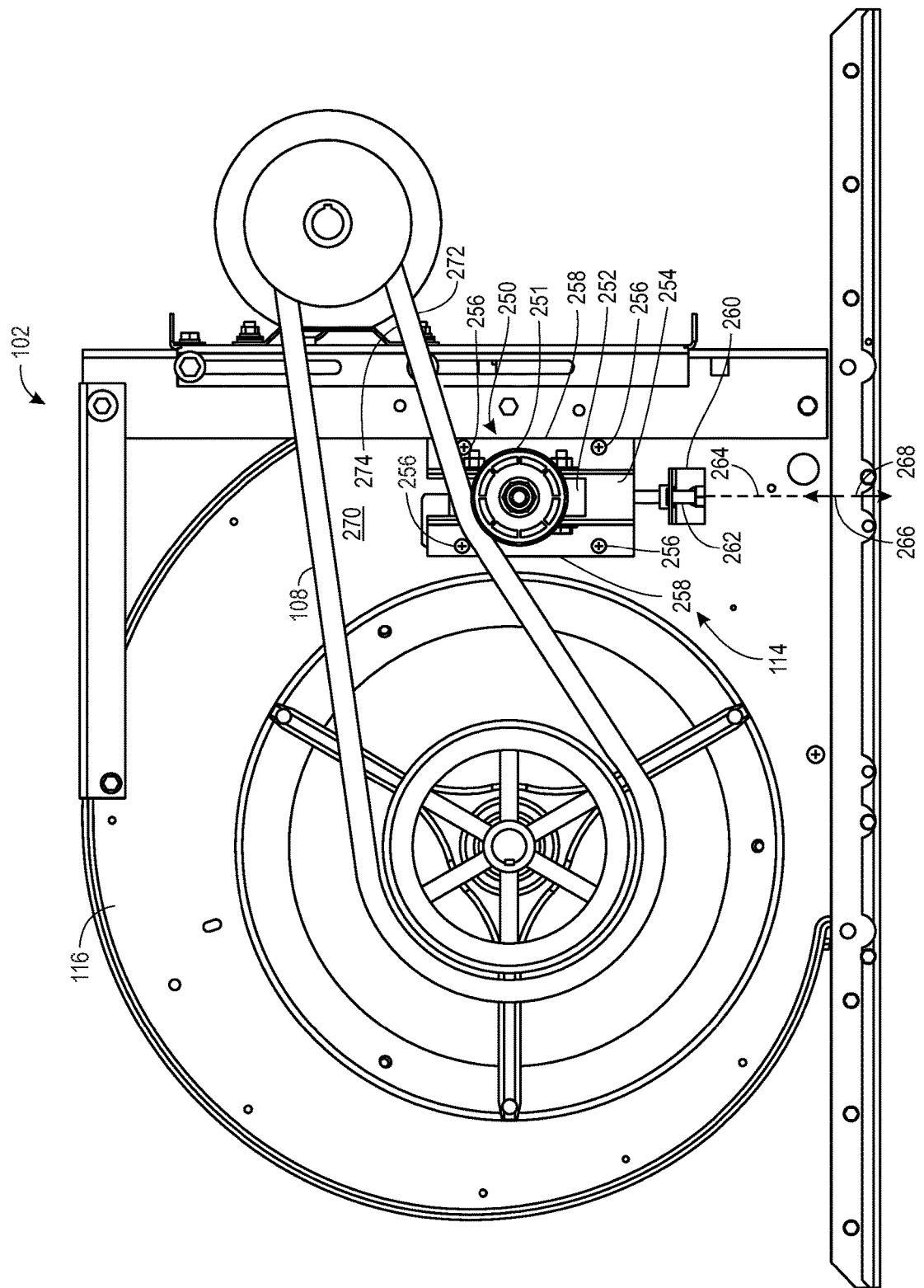
FIG. 14 is a front view of an embodiment of a belt tensioner, in accordance with aspects of the present disclosure.

In some embodiments, portions of the belt tensioner 114 may be configured to adjust in a linear direction to adjust the tension in the drive belt 108. For example, FIG. 14 is a side view of the blower assembly 102 having an embodiment of the belt tensioner 114 mounted to the blower housing 116, as similarly described above. In the illustrated embodiment, an idler pulley assembly 250 of the belt tensioner 114 is configured to be linearly repositioned to adjust the tension in the drive belt 108.

As shown, the belt tensioner 114 includes the idler pulley assembly 250, which includes an idler pulley 251 configured to engage with the drive belt 108 to adjust a tension in the drive belt 108. The idler pulley assembly 250 is mounted to an idler mounting plate 252. The idler mounting plate 252 is configured to move linearly within a guide rail 254 of the belt tensioner 114. That is, the guide rail 254 is configured to guide the idler mounting plate 252 to move substantially linearly along a guide path, and the belt tensioner 114 is configured to retain a position of the idler mounting plate 252 at a selected position to apply a desired tension on the drive belt 108. The guide rail 254 is mounted directly to the blower housing 116 via a set of mounting fasteners 256, such as bolts and/or screws, extending through mounting flanges 258 of the guide rail 254. Particularly, as shown in the illustrated embodiment, the guide rail 254 may include two mounting flanges 258 extending along a surface of the blower housing 116 in a mounted configuration. Each mounting flange 258 is configured to receive one or more, such as two, mounting fasteners 256 to couple the guide rail 254 to the blower housing 116. Accordingly, the idler pulley assembly 250 and the idler mounting plate 252 are configured to be linearly adjusted relative to the blower housing 116 and the guide rail 254 to adjust a degree to which the idler pulley 251 imparts a force on the drive belt 108 to adjust tension in the drive belt 108.

The belt tensioner 114 further includes a lock plate 260 and a bolt 262. The lock plate 260 is also mounted directly to the blower housing 116. The bolt 262 extends through the lock plate 260 and through a flange of the idler mounting plate 252, as discussed in further detail below. The bolt 262 is configured to be rotated about a longitudinal axis 264 of the bolt 262 to linearly adjust a position of the idler pulley assembly 250. That is, rotation of the bolt 262 about its longitudinal axis 264 causes a linear position of the bolt 262 to be adjusted relative to the lock plate 260 and the guide rail 254. At the same time, a linear position of the bolt 262 is maintained relative to the idler mounting plate 252 during rotation of the bolt 262 about its longitudinal axis 264. In other words, the bolt 262 and the idler mounting plate 252 are fixed to one another, such that linear movement of the bolt 262 causes corresponding linear movement of the idler mounting plate 252 and the idler pulley 251. Therefore, rotation of the bolt 262 about its longitudinal axis 264 causes the idler mounting plate 252 to be linearly adjusted, thereby similarly adjusting a linear position of the idler pulley 251 to adjust the tension in the drive belt 108.

To further illustrate, the bolt 262 may be rotated in a first direction, such as clockwise, about the longitudinal axis 264 to cause the idler pulley 251 to move linearly toward the drive belt 108, as indicated by arrow 266. When the idler pulley 251 is in contact with the drive belt 108 and moving in the direction 266, the tension in the drive belt 108 may increase. Similarly, the bolt 262 may be rotated in a second direction, such as counter-clockwise, about the longitudinal axis 264 to cause the idler pulley 251 to move linearly away from the drive belt 108, as indicated by arrow 268. When the idler pulley 251 is in contact with the drive belt 108 and moving in the direction 268, the tension in the drive belt 108 may decrease. Indeed, in some embodiments, the idler pulley 251 may be positioned such that it is not in contact with the drive belt 108. Accordingly, the idler pulley 251 may be positioned to contact the drive belt 108 with a desired force to affect or adjust the tension in the drive belt 108.

As shown, in the current embodiment, the belt tensioner 114 is positioned such that the idler pulley 251 is disposed external to an interior region 270 defined by the drive belt 108. Thus, with the idler pulley 251 positioned external to or outside of the interior region 270, the idler pulley 251 is configured to contact an exterior edge or surface 272 of the drive belt 108 to adjust tension in the drive belt 108. However, in some embodiments, the belt tensioner 114 may be positioned such that the idler pulley 251 is disposed within the interior region 270. In such embodiments, the idler pulley 251 is configured to contact an interior edge or surface 274 of the drive belt 108 to adjust tension in the drive belt 108.

Figure 15:
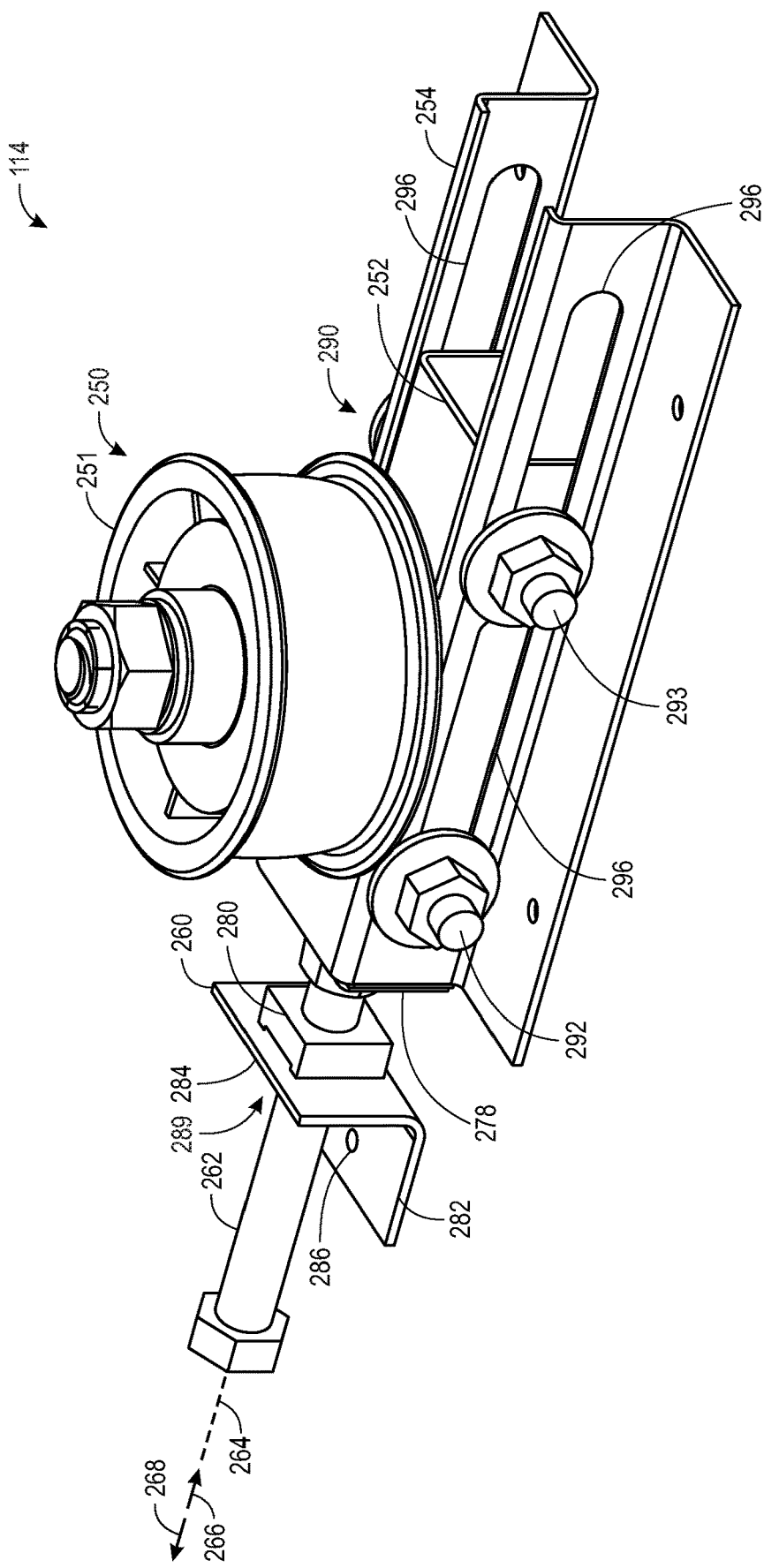
FIG. 15 is a perspective view of an embodiment of a belt tensioner, in accordance with aspects of the present disclosure.
Figure 16:
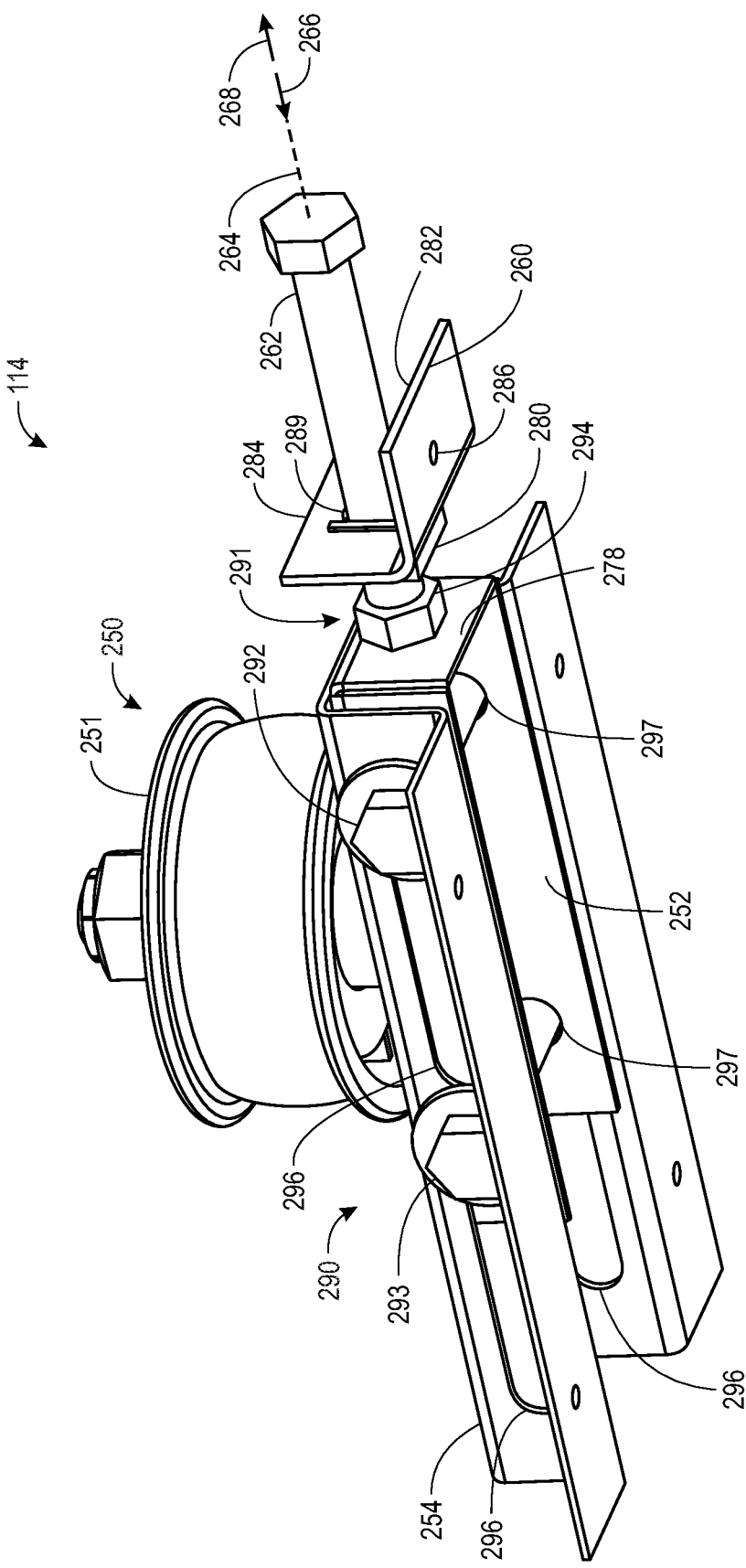
FIG. 16 is a perspective view of an embodiment of a belt tensioner, in accordance with aspects of the present disclosure.

FIGS. 15 and 16 are perspective views of an embodiment of the belt tensioner 114. More specifically, the perspective view shown in FIG. 15 more clearly shows an outside-facing portion of the belt tensioner 114, relative to the blower housing 116 when belt tensioner 114 is coupled to the blower housing 116. The perspective view shown in FIG. 16 more clearly shows an inside-face portion of the belt tensioner 114, relative to the blower housing 116 when the belt tensioner 114 is coupled to the blower housing 116. FIGS. 15 and 16 will are discussed in parallel below. As shown, the belt tensioner 114 includes the idler pulley assembly 250, which is mounted to the idler mounting plate 252. The idler mounting plate 252 is configured to move, such as by sliding, linearly within the guide rail 254. As mentioned above, the belt tensioner 114 also includes the bolt 262 extending through the lock plate 260 and through a flange 278 of the idler mounting plate 252.

The lock plate 260 includes a mounting portion 282 or flange and a locking portion 284 or flange. In some embodiments, the mounting portion 282 may extend substantially perpendicular from and relative to the locking portion 284, as shown. The mounting portion 282 may be coupled to the blower housing 116 via a fastener, such as a bolt or screw, which extends through a first aperture 286 formed in the mounting portion 282. A second aperture 289 extends through the locking portion 284 of the lock plate 260 and is configured to receive a nut 280, such as a clench nut or swage nut. That is, the nut 280 is configured to be press fit or cold worked into the second aperture 289 to couple the nut 280 to the lock plate 260 and be held rotationally stationary relative to the second aperture 289. Particularly, the nut 280 may include teeth or ridges that are configured to engage with a surface of the mounting portion 284 defining a perimeter of the second aperture 289. In some embodiments, the nut 280 may be any suitable fastener configured to be held rotationally still within or adjacent to the aperture 290. For example, the nut 280 may be a hexagonal rivet nut, and the second aperture 289 may be hexagonally-shaped to receive the hexagonal rivet nut. The nut 280 includes internal threads with which corresponding threads of the bolt 280 may engage. In some embodiments, the lock plate 260 may include any suitable threaded element that provides a threaded surface about the second aperture 289, such as the nut 280. In certain embodiments, the lock plate 260 may include a threaded surface integrally formed with the second aperture 289. Accordingly, the bolt 262 extends through the second aperture 289 and engages with a threaded surface, such as threads of the nut 280, such that rotation of the bolt 280 causes the bolt 262 to be linearly adjusted relative to and through the second aperture 289.

As mentioned above, the bolt 262 also extends through the flange 278 of the idler mounting plate 252. Particularly, the bolt 262 extends through a third aperture 291 that is disposed through the flange 278. The bolt 262 may rotate freely within the third aperture 291 of the flange 278. The bolt 262 bolt is also held linearly stationary relative to the flange 278. To this end, the belt tensioner 114 may include a fastening system, such as a pair of locking nuts 294, disposed along the thread of the bolt 262 with the flange 278 disposed between the two locking nuts 294. The pair of locking nuts 294 may be more clearly viewed in FIG. 17. A distance between the two locking nuts 294 along the shaft of the bolt 262 may be slightly larger than a thickness of the flange 278. Particularly, the two locking nuts 294 may be positioned along the bolt 262, such that the two locking nuts 294 prevent substantial linear movement of the bolt 262 relative to the flange 278 while allowing the bolt 262 to rotate relative to the flange 278.

The belt tensioner 114 further includes a locking assembly 290 configured to selectively lock or fix a linear position of the idler mounting plate 252 relative to the guide rail 254. The locking assembly 290 includes a first fastener 292 and a second fastener 293. The locking assembly 290, and more specifically, the first fastener 292 and the second fastener 293, may be engaged, such as via torqueing, to lock a position of the idler mounting plate 252 relative to the guide rail 254. Similarly, the locking assembly 290 may be disengaged, such as via torqueing, to enable linear movement of the idler mounting plate 252 relative to the guide rail 254. As discussed in further detail below, the first fastener 292 and the second fastener 293 may both extend through slots 296 disposed through guide rail 254 and through holes 297 disposed through the idler mounting plate 252. In some embodiments, the first fastener 292 and the second fastener 293 may each extend substantially perpendicularly relative to the longitudinal axis 264. As the idler mounting plate 252 and the idler pulley 251 are translated linearly in response to rotation of the bolt 262, as discussed above, the first fastener 292 and the second fastener 293 may be translated within respective slots 296 of the guide rail 254. Accordingly, lengths of the slots 296 may provide a limit to the linear distance for which the idler mounting plate 252 may travel within the guide rail 254.

Figure 18:
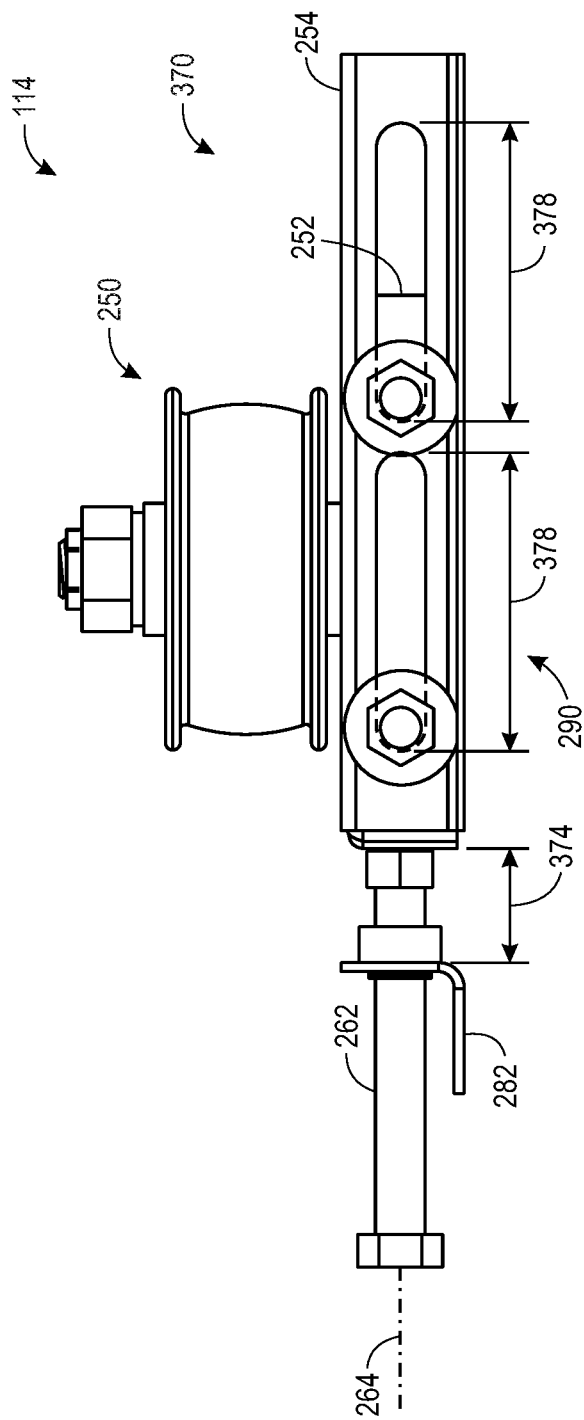
FIG. 18 is a side view of an embodiment of a belt tensioner, in accordance with aspects of the present disclosure.
Figure 19:
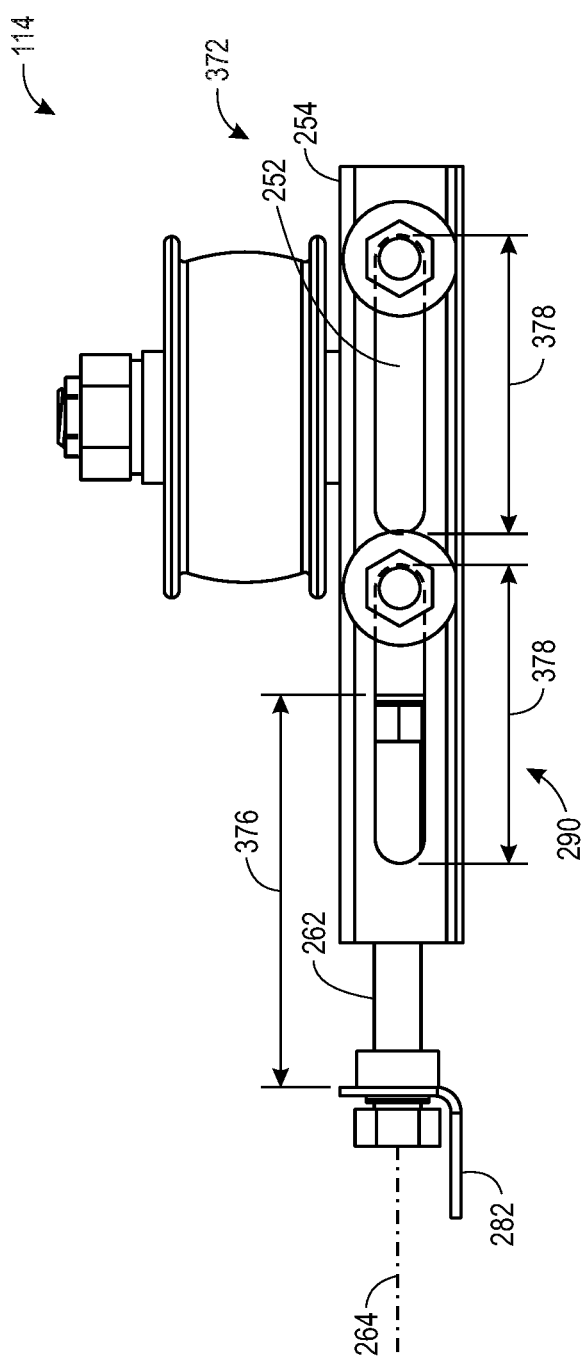
FIG. 19 is a side view of an embodiment of a belt tensioner, in accordance with aspects of the present disclosure.

For example, as discussed in further detail below with reference to FIGS. 18 and 19, the idler mounting plate 252 and the idler pulley 251 may travel between a first boundary position and a second boundary position. The linear positional difference between the first boundary position and the second boundary position may be equal to the length of the slots 296. The locking assembly 290 may be engaged to lock the idler mounting plate 252 at the first boundary position, at the second boundary position, or at a position between the first and second boundary positions.

Figure 17:
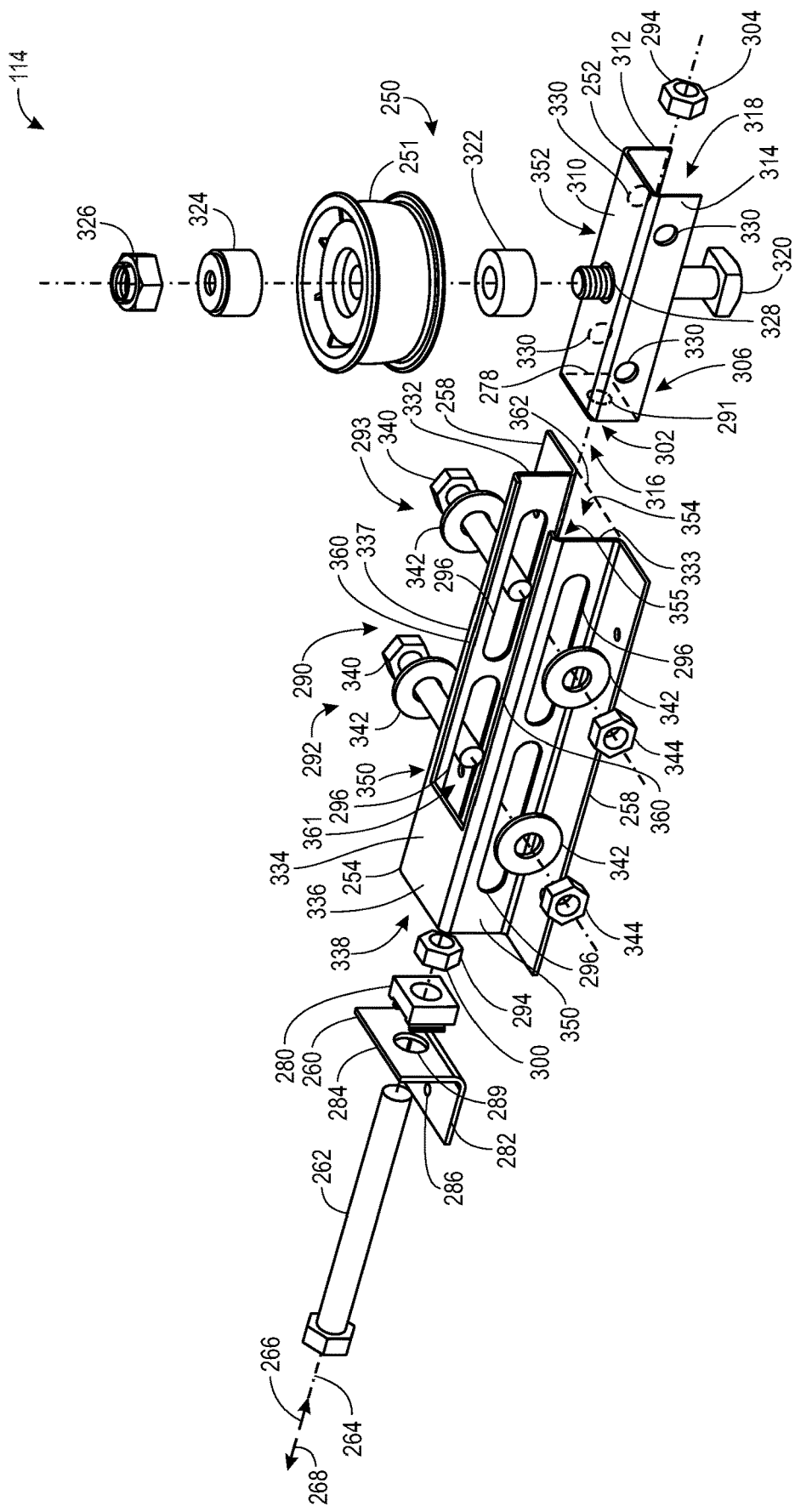
FIG. 17 is an exploded perspective view of an embodiment of a belt tensioner, in accordance with aspects of the present disclosure.

FIG. 17 is an exploded perspective view of an embodiment of the belt tensioner 114. As shown, the belt tensioner 114 includes the lock plate 260, the idler pulley assembly 250, the idler mounting plate 252, the locking assembly 290, the guide rail 254, and the bolt 262.

As discussed above, the lock plate 260 includes the mounting portion 282 and the locking portion 284 and may be formed as a single piece. The mounting portion 282 may be disposed substantially perpendicular relative to the locking portion 284. The mounting portion 282 includes the first aperture 286 configured to receive a fastener to couple the locking plate 260 to the blower housing 116. The locking portion 284 includes the second aperture 289 configured to receive and secure the nut 280. Indeed, as mentioned above, the nut 280 may be coupled to the second aperture 289, such that the nut 280 is held rigidly relative to the second aperture 289. In other embodiments, the locking portion 284 may include any suitable threaded surface configured to engage threads of the bolt 262 about the second aperture 289.

The bolt 262 extends through the lock plate 260 and engages with threads of the nut 280 or other threaded surface. The bolt 262 also extends through the flange 278 of the idler mounting plate 252 and engages with threads of the pair of locking nuts 294. To illustrate, a first locking nut 300 of the pair of locking nuts 294 may be disposed along the shaft of the bolt 262 adjacent to a first side 302 of the flange 278. Further, a second locking nut 304 of the pair of locking nuts 294 may be disposed along the shaft of the bolt 262 adjacent to a second side 306 of the flange 278. The pair of locking nuts 294 may hold a linear position of the bolt 262, along the longitudinal axis 264, substantially fixed relative to the flange 278 while enabling rotation of the bolt 262 relative to the flange 278 about the longitudinal axis 264.

For example, during rotation of the bolt 262 to cause the bolt 262 to move in the direction 266, the bolt 262 rotates within the aperture 291 of the flange 278, and the first locking nut 300 of the locking nuts 294 may contact the flange 278 and push the flange 278 in the direction 266, while the second locking nut 304 of the locking nuts 294 may be spaced slightly apart from the flange 278. Similarly, during rotation of the bolt 262 to cause the bolt 262 to move in the direction 268, the second locking nut 304 may contact the flange 278 and pull the flange 278 in the direction 268 while the first locking nut 300 is spaced slightly apart from the flange 278. Accordingly, in this configuration, the locking nuts 294 are configured to substantially block linear movement of the bolt 262 relative to the flange 278 and enable rotational movement of the bolt 262 within the aperture 291 of the flange 278.

The idler mounting plate 252 includes the flange 278, an outward-facing portion 310, a first lateral portion 312, and a second lateral portion 314. As shown, the first and second lateral portions 312, 314 may be substantially parallel relative to each other. The outward-facing portion 310 may extend between the first and second lateral portions 312, 314 and may be disposed substantially perpendicularly relative to the first and second lateral portions 312, 314. The flange 278 may be disposed at a first end 316 of the idler mounting plate 252 and may extend between the outward-facing portion 310 and the first and second lateral portions 312, 314. The flange 278 may be disposed substantially perpendicularly relative to the outward-facing portion 310 and the first and second lateral portions 312, 314. A second end 318, disposed opposite of the first end 316, of the idler mounting plate 252 may be substantially open, such that the second end 318 does not include a flange, such as the flange 278. In other words, the idler mounting plate 252 may be a U-bracket which is closed at the first end 316 via the flange 278.

The idler pulley assembly 250 is coupled to the outward-facing portion 310 of the idler mounting plate 252. The idler pulley assembly 250 includes an idler bolt 320, a first bushing 322, the idler pulley 251, a second bushing 324, and a nut 326. As shown, the idler bolt 320 extends through a hole 328 disposed through the outward-facing portion 310. The idler bolt 320 may further extend through holes or bores of each of the first bushing 322, the idler pulley 251, the second bushing 324, and the nut 326, sequentially as shown. The first and second bushings 322, 324 may help to absorb forces experienced by the idler pulley 251 from the drive belt 108. For example, in some embodiments, such as the embodiment shown in FIG. 15, the first and second bushings 322, 324 may be disposed axially between the idler pulley 251 and the idler bolt 320, relative to a longitudinal axis of the idler bolt 320, such that the idler pulley 251 is in contact with the first and second bushings 322, 324 and not in contact with the bolt 320, thereby decreasing an amount of force that is transferred from the idler pulley 251 to the idler bolt 230. The first bushing 322 may also reduce or eliminate contact between the idler pulley 251 and the idler mounting plate 252 and the guide rail 254 to reduce friction therebetween. In some embodiments, the idler pulley 251 may include one or more bearings configured to further reduce friction experienced during rotation of the idler pulley 251 when the idler pulley 251 is in contact with the drive belt 108. The nut 326 may be a lock nut that is configured to resist loosening from torque or vibrations. For example, the nut 326 may include a portion, such as an elastic insert, that is configured to plastically deform to engage with the threads of the idler bolt 320 and provide a locking engagement between the idler bolt 320 and the nut 326. Further, as discussed above, the idler mounting plate 252 may be disposed internal to the guide rail 254, the idler pulley 251 may be disposed external to the guide rail 254, and the idler bolt 320 may extend between the idler mounting plate 252 and the idler pulley 251 in an assembled configuration of the belt tensioner 114.

The first lateral portion 312 and the second lateral portion 314 of the idler mounting plate 252 may each include two holes 330 configured to receive the first and second fasteners 292, 293 of the locking assembly 290. However, it is to be understood that the first and second lateral portions 312, 314 may each include any suitable number of holes 330 configured to receive any suitable respective number of fasteners of the locking assembly 290. The first and second fastener 292, 293 may also extend through the slots 296 of the guide rail 254, as discussed above.

Particularly, a first side portion 332 and a second side portion 333 of the guide rail 254 may each include two of the slots 296 discussed above. As shown, the first side portion 332 and the second side portion 333 may both extend substantially perpendicularly from mounting flanges 258. Indeed, the first and second side portions 332, 333 may also be substantially parallel relative to each other. However, it is to be understood that in some embodiments, the first and second side portions 332, 333 may be disposed at any suitable angle relative to each other and relative to the mounting flanges 258. Further, it is to be understood that the first and second side portions 332, 333 may include any suitable number of slots 296, which may correspond to any suitable number of fasteners of the locking assembly 290. The guide rail 254 may further include an outward-facing portion 334. The outward-facing portion 334 may include a connecting portion 336, which extends between and couples the first and second side portions 332, 333. As shown, the connecting portion 336 is disposed substantially at an end 338 of the outward-facing portion 334 and a majority of the outward-facing portion 334 of the guide rail 254 may be substantially open such as to enable linear movement of the idler pulley assembly 250 through the outward-facing portion 334. Indeed, the outward-facing portion 334 may further include a guide portion 337, as discussed in further detail below.

The first and second fasteners 292, 293 of the locking assembly 290 may each include a bolt 340, a pair of washers 342, and a nut 344. As shown, the bolt 340 sequentially extends through one of the washers 342, through one of the slots 296 of the first side portion 332 of the guide rail 254, through one of the holes 330 of the first lateral portion 312 of the idler mounting plate 252, through one of the holes 330 of the second lateral portion 314 of the idler mounting plate 252, through one of the slots 296 of the second side portion 333 of the guide rail 254, through one of the washers 342, and through the nut 344. Accordingly, the locking assembly 290 is configured to be tightened, such as via torqueing of the bolt 340 and/or the nut 344, to fix a position of the idler mounting plate 252 relative to the guide rail 254, such that the belt tensioner 114 is in a locked configuration. Specifically, in the locked configuration, the washers 342 may apply a pressure to external surfaces 350 of the first and second side portions 332, 333 of the guide rail 254 to block movement of the idler mounting plate 252 relative to the guide rail 254. The locking assembly 290 is also configured to be loosened in a similar fashion, such as by torqueing the bolt 340 and/or the nut 344 in an opposite direction to the tightening direction. Particularly, the locking assembly 290 may be loosened such that the belt tensioner 114 is in an unlocked configuration, thereby enabling movement of the idler mounting plate 252 relative to the guide rail 254 via rotation of the bolt 262.

As discussed herein, the idler mounting plate 252 is configured to move within the guide rail 254. To this end, in some embodiments, the contour of an external surface 352 or edge of the idler mounting plate 252 may substantially match the contour of an internal surface 354 or edge of the guide rail 254. The external surface 352 of the idler mounting plate 252 may be defined by external surfaces of the first lateral portion 312, the second lateral portion 314, and the outward-facing portion 310 of the idler mounting plate 252. The internal surface 354 of the guide rail 254 may be defined by internal surfaces of the first side portion 332, the second side portion 333, and the outward-facing top portion 334. Further, the internal surface 354 may define an interior region 355 of the guide rail 254. Keeping this in mind, the outward-facing portion 334 of the guide rail 254 may include the guide portion 337 through which the idler pulley assembly 250 may translate during positional adjustment of the belt tensioner 114. Edges of the guide portion 337 may be defined by guides 360. Specifically, the guide rail 254 may include two guides 360, such as flanges or lips, which extend from the first and second side portions 332, 333 toward an opening 361 of the guide portion 337. In some embodiments, the guides 360 may extend substantially perpendicularly from the first and second side portions 332, 333, or in any other suitable direction to match the contour of the external surface 352 of the idler mounting plate 252. Accordingly, while the idler mounting plate 252 moves within the guide rail 254, the guides 360 may restrain the idler mounting plate 252 from moving outward and beyond the outward-facing portion 334 of the guide rail 254.

Further, because the mounting flanges 258 may be mounted to the blower housing 116, the blower housing 116 may restrain the idler mounting plate 252 from moving outwardly away from the outward-facing portion 334 of the guide rail 254. In some embodiments, the guide rail 254 may include a bottom surface 362 against which the idler mounting plate 252 may be supported to prevent outward motion of the idler mounting plate 252. Further, in some embodiments, outward motion, such as movement towards or away from the top portion 334 may be prevented through support of the locking assembly 290 via the slots 296. That is, the idler mounting plate 252 may not necessarily contact the blower housing 116, the guides 360, and/or the bottom surface 362 during operation of the belt tensioner 114.

The guide rail 254 and the idler pulley assembly 250 may be configured to move substantially parallel to the longitudinal axis 264 to adjust tension in the drive belt 108. Particularly, as illustrated in FIGS. 18 and 19, the belt tensioner 114 may be adjusted between a first position 370, such as a first boundary position or a fully retracted position, and a second position 372, such as a second boundary position or a fully extended or engaged position. That is, FIG. 18 shows the belt tensioner 114 in the first position 370, and FIG. 19 shows the belt tensioner 114 in the second position 372. The belt tensioner 114 may be positioned at any location along the guide rail 254 between the first position 370 and the second position 372 to adjust a tension in the drive belt 108.

As shown, positioning of the belt tensioner 114 at or between the first and second positions 370, 372 may cause certain components to move while others are held stationary. For example, torqueing of the bolt 262 to cause the belt tensioner 114 to move between the first and second positions 370, 372 causes the bolt 262, the idler mounting plate 252, the locking assembly 290, and the idler pulley assembly 250 to move along the longitudinal axis 264 and relative to the lock plate 262 and the guide rail 254. Indeed, the lock plate 262 and the guide rail 254 may be mounted directly rigidly to the blower housing 116 and may not move during positional adjustment of the belt tensioner 114.

In the first position 370, the flange 278 of the guide rail 252 may be a first distance 374 away from the lock plate 262, measured along the longitudinal axis 264. In the second position 372, the flange 278 of the guide rail 252 may be a second distance 376 away from the lock plate 262, measured along the longitudinal axis 264. Further, the slots 296 of the guide rail 254 may have or be associated with a length 378. A difference between the first distance 374 and the second distance 376 may be approximately equal to the length 378 of the slots 296. More specifically, the difference between the first distance 374 and the second distance 376 may be substantially equal to the length of the slots 296 minus the cumulative diameter of the bolts 340 of the locking system 290. In other words, the distance between the first position 370 and the second position 372 may be limited by the distance to which the bolts 340 of the locking system 290 may travel within the slots 296.

Figure 20:
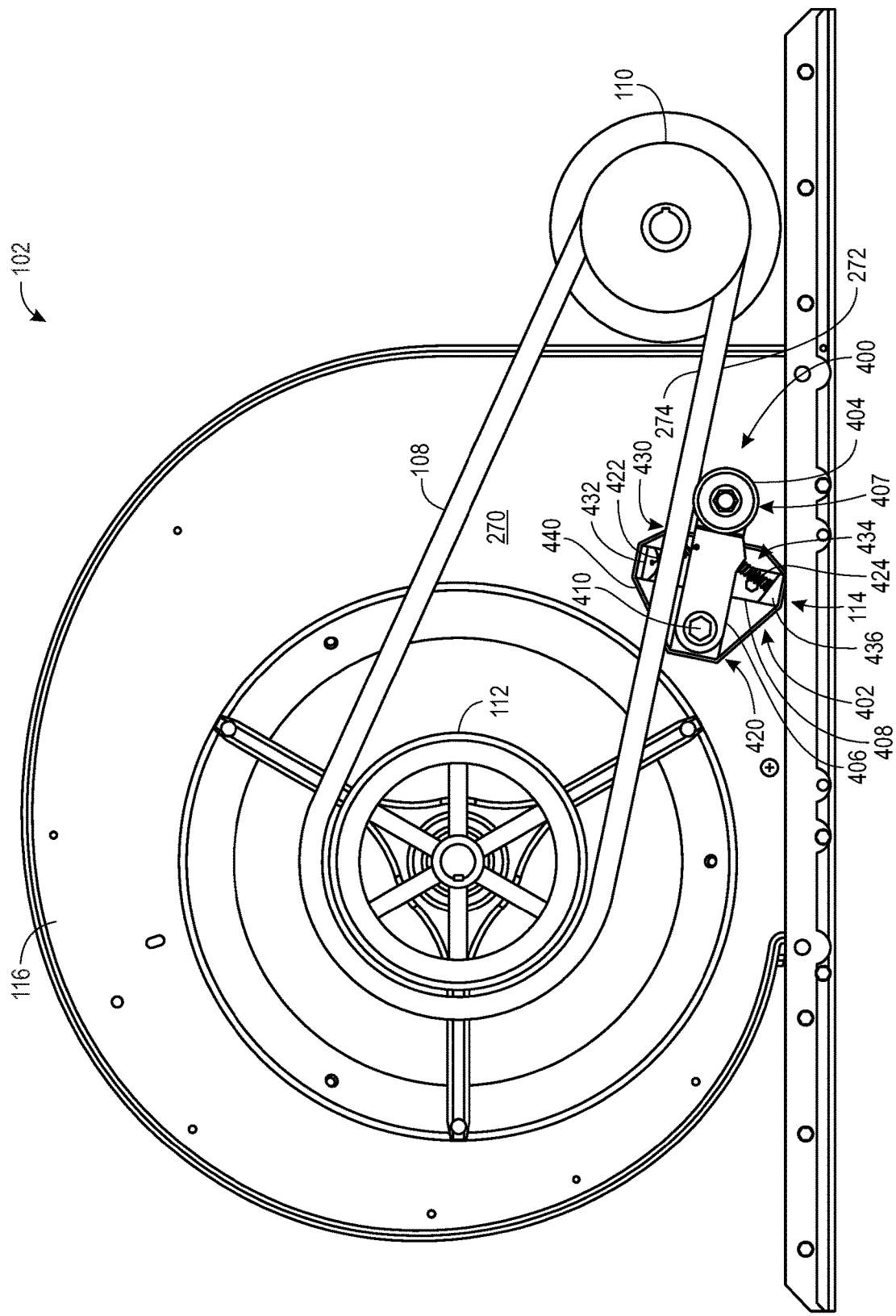
FIG. 20 is a front view of an embodiment of a belt tensioner, in accordance with aspects of the present disclosure.

In some embodiments, the belt tensioner 114 may be configured to automatically adjust tension in the drive belt 108 via a set of springs. For example, FIG. 20 is a front view of an embodiment of the belt tensioner 114 mounted to the blower housing 116, as similarly described above. In the illustrated embodiment, an idler pulley assembly 400 is configured to adjust a tension in the drive belt 108 via a set of springs 402. The springs 402 may be linearly actuated, such that the springs 402 are configured to compress or elongate in a substantially linear direction in response to a reactive load applied to the idler pulley assembly 400 through contact of the idler pulley assembly 400 with the drive belt 108. The springs 402 enable an active distribution of load between the springs 402, thereby increasing a longevity of the springs 402 and of the belt tensioner 114. In other words, the load applied to the idler pulley assembly 400 via the drive belt 108 is actively distributed amongst the springs 402, which enables automatic load distribution and increases longevity of the belt tensioner 114 and the drive belt 108.

As shown, the idler pulley assembly 400 includes an idler pulley 404 configured to engage with the drive belt 108 to adjust a tension in the drive belt 108. The idler pulley 404 is mounted to an idler arm 406 of the belt tensioner 114 at a distal end 407 of the idler arm 406. The idler arm 406 is coupled to a mounting bracket 408 at a pivot point 410, which defines a pivot axis of the idler arm 406. The pivot point 410 may be disposed at an opposite end of the idler arm 406 relative to the distal end 407. The idler arm 406 and the idler pulley 404 are configured to rotate about the pivot point 410 as the idler pulley assembly 400 reacts to a load imparted by the drive belt 108. Particularly, a pivot fastener 420 may couple the idler arm 406 to the mounting bracket 408 at the pivot point 410, such that the idler arm 406 and the idler pulley 404 are configured to rotate about the pivot fastener 420. The idler arm 406 is further coupled to the mounting bracket 408 via the springs 402. The springs 402 may include a tension spring 422, or a first spring, and a compression spring 424, or a second spring. Both the tension spring 422 and the compression spring 424 extend between respective sides of the idler arm 406 and respective portions of the mounting bracket 408. Particularly, the tension spring 422 may be coupled to a first side 430 of the idler arm 406 and to a first arm extension 432 of the mounting bracket 408. Similarly, the compression spring 424 may be coupled to a second side 434 of the idler arm 406 and to a second arm extension 436 of the mounting bracket 408.

As discussed herein, a resting length of the tension spring 422, such as when a length of the tension spring 422 is not in an adjusted state in response to a load, may be defined when passes of the coil of the tension spring 422 are substantially in contact with one another or in a compressed state. Accordingly, in some embodiments, the tension spring 422 may be actuated via elongation from its resting length to provide a predictable reactive force. Indeed, in some embodiments, compression of the tension spring 422 from its resting length may result in an unpredictable reactive force. In some embodiments, the tension spring 422 may be defined by a spring of the springs 402 being in tension when the belt tensioner 144 is installed and engaged with the drive belt 108, as described herein. Further, a resting length of the compression spring 424, such as when a length of the compression spring 424 is not in an adjusted state in response to a load, may be defined when passes of the coils of the compression spring 424 are spaced apart from each other or in an expanded state. Accordingly, in some embodiments, the compression spring 424 may be actuated via shortening or compression from its resting length to provide a predictable reactive force. In some embodiments, the compression spring 424 may be defined by a spring of the springs 402 being in compression when the belt tensioner 144 is installed and engaged with the drive belt 108, as described herein. It should be noted, however, that in some embodiments, the springs 402 may include one or more springs that are configured to function as both a compression spring and/or a tension spring, as discussed above.

As illustrated in the current embodiment, the belt tensioner 114 may be positioned relative to the drive belt 108, such that the belt tensioner 114 is configured to contact the drive belt 108, via the idler pulley 404, adjacent to the first side 430 of the idler arm 406. In this manner, as the drive belt 108 contacts the idler pulley 404 and imparts a reactive load against the idler pulley 404, the tension spring 422 may reactively elongate or be placed in tension, and the compression spring 424 may reactively compress or be placed in compression.

The belt tensioner 114 is configured to automatically adjust a tension in the drive belt 108 via the springs 402. For example, as opposed to rigid belt tensioners, the belt tensioner 114 may be configured to dynamically or actively reposition the idler pulley 404 in response to a tension or lack thereof in the drive belt 108. To illustrate, while the idler pulley 404 is in contact with the drive belt 108, the drive belt 108 may impart a force or reactive load on the idler pulley 404, which causes rotation of the idler arm 406 about the pivot point 410. The rotation of the idler arm 406 causes the springs 402 to actuate and provide a reactive force on the idler pulley 404 through the idler arm 406. For example, when a tension in the drive belt 108 is reduced during operation of the blower assembly 102, the reactive force provided by the springs 402 may cause the idler pulley 404 and the idler pulley assembly 400 to impart a force on the drive belt 108 and to further increase tension in the drive belt 108. When a tension of the drive belt 108 increases during operation of the blower assembly 102, the reactive force provided by the springs 402 may decrease and cause the idler pulley 404 and the idler pulley assembly 400 to decrease a force applied on the drive belt 108. Accordingly, the belt tensioner 114 may be positioned such that the idler pulley 404 contacts the drive belt 108 and the springs 402 are linearly actuated, such as through compression of the compression spring 424 and extension of the tension spring 422 based on an active tension in the drive belt 108. As used herein, a position of the drive belt 108 may refer to a path along which the drive belt 108 travels, such as between the motor pulley 110 and the blower pulley 112, during operation of the blower assembly 102. Accordingly, deflection of the drive belt 108 may refer to displacement of the drive belt 108 from the path at a point along the path.

In some embodiments, as the drive belt 108 loosens over time, the force applied to the springs 402 by the drive belt 108 may correspondingly decrease, which may cause the tension spring 422 to compress and the compression spring to elongate 424. This actuation of the springs 402 may cause increased deflection of the drive belt 108 to substantially maintain a desired tension in the drive belt 108. In other words, the springs 402 may dynamically respond, such as via linear actuation, to a loss of tension in the drive belt 108 by increasing the distance to which the drive belt 108 is deflected, thereby substantially automatically maintaining a desired tension in the drive belt 108. In some embodiments, the actuation of the springs 402 as described above may be a result of fluctuations, or small deflections, in the position of the drive belt 108 during normal operation. As the drive belt 108 fluctuates, the springs 402 may actuate as described above to bias the idler pulley 404 toward and in contact with the drive belt 108 to substantially maintain a tension in the drive belt 108. That is, the springs 402 may cause the idler pulley 404 to reactively move in conjunction with the fluctuations of the drive belt 108 to maintain steady engagement between the idler pulley 404 and the drive belt 108.

As shown in the currently illustrated embodiment, the belt tensioner 114 is positioned such that the idler pulley 404 is disposed external to the interior region 270 defined by the drive belt 108. Thus, with the idler pulley 404 positioned external to or outside of the interior region 270, the idler pulley 404 is configured to contact the exterior edge or surface 272 of the drive belt 108 to adjust tension in the drive belt 108. However, in some embodiments, the belt tensioner 114 may be positioned such that the idler pulley 404 is disposed within the interior region 270. In such embodiments, the idler pulley 404 is configured to contact the interior edge or surface 274 of the drive belt 108 to adjust tension in the drive belt 108.

In the currently illustrated embodiment, the belt tensioner 114 is coupled directly to the blower housing 116 via the mounting bracket 408. In some embodiments, as discussed in further detail below, the mounting bracket 408 may be coupled to a mounting plate and/or blower structure, which in turn may be coupled to the blower housing 116 or other structure of the blower assembly 102. Further, the belt tensioner 114 may include a tensioner housing 440 disposed about the mounting bracket 408 and about a portion of the idler arm 406. Indeed, the idler arm 406 may be disposed substantially within the tensioner housing 440 with the distal end 407 extending from the confines of the tensioner housing 440. That is, the idler pulley 404 mounted to the distal end 407 may remain exposed to contact the drive belt 108. In other words, the tensioner housing 440 may substantially encompass the belt tensioner 114, except for the distal end 407 of the idler arm 406 and the idler pulley 404. In some embodiments, the tensioner housing 440 may include a portion disposed between the mounting bracket 408 and the blower housing 116. For example, one or more fasteners configured to couple the mounting bracket 408 to the blower housing 116 may extend sequentially through the mounting bracket 408, through the tensioner housing 440, and through the blower housing 116 to mount the belt tensioner 114 to the blower housing 116. In this way, the tensioner housing 440 may substantially encapsulate the belt tensioner 114 and is configured to block or inhibit contaminants, such as debris or fluids, from interacting with components of the belt tensioner 114. Specifically, tensioner housing 440 may protect the springs 402 and the pivot fastener 420 from the contaminants to increase the longevity of the belt tensioner 114.

Figure 21:
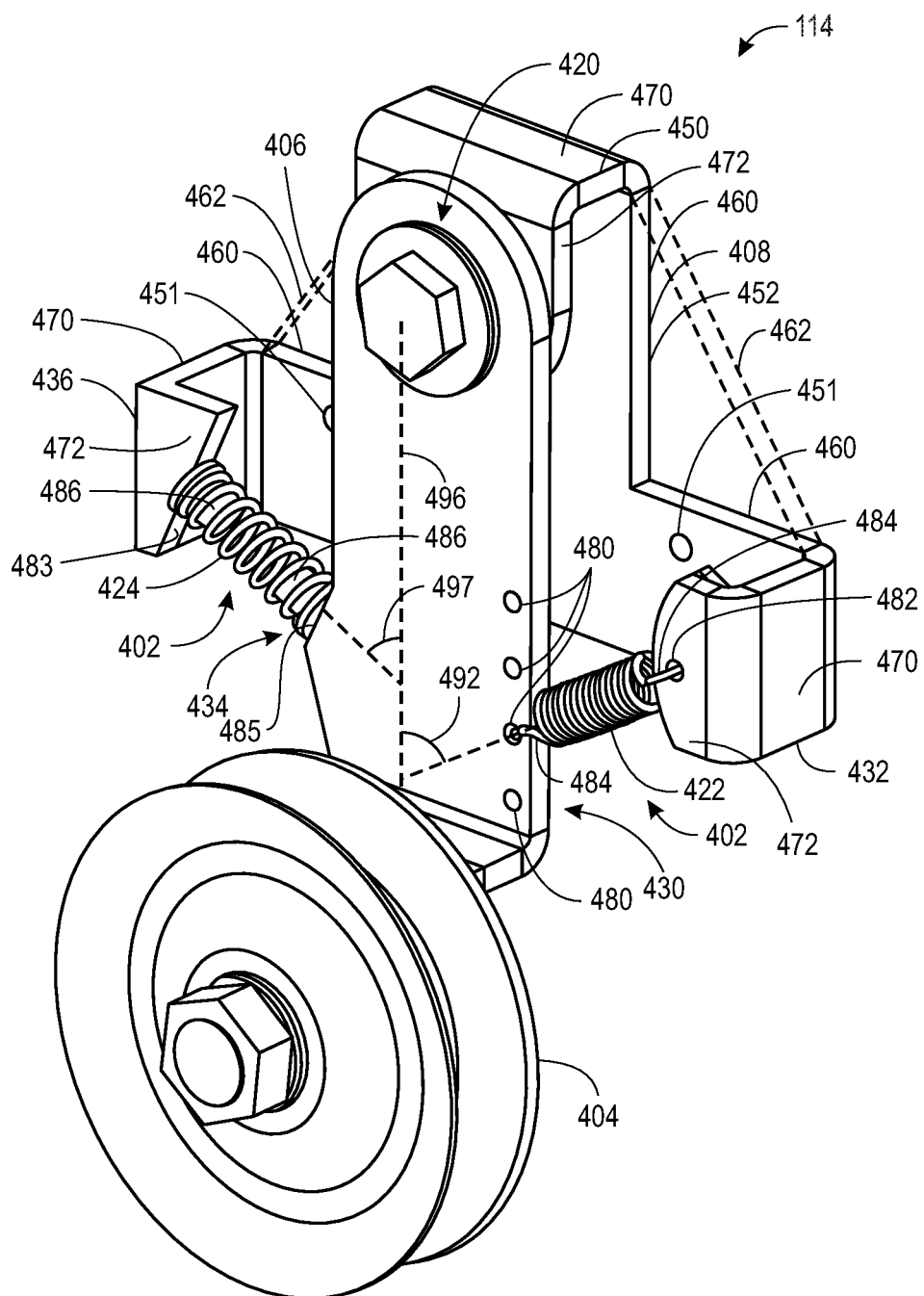
FIG. 21 is a perspective view of an embodiment of a belt tensioner, in accordance with aspects of the present disclosure.

FIG. 21 is a perspective view of an embodiment of the belt tensioner 114. As shown, the idler arm 406 is coupled to the mounting bracket 408 via the springs 402 and the pivot fastener 420. The tension spring 422 may be coupled to the first arm extension 432 of the mounting bracket 408, and the compression spring 424 may be coupled to the second arm extension 436 of the mounting bracket 408. The pivot fastener 420 may be coupled to the idler arm 406 and to a third arm extension 450 of the mounting bracket 408. Indeed, as shown, the mounting bracket 408 may include a base or backing portion 452, the first arm extension 432, the second arm extension 436, and the third arm extension 450. The backing portion 452 may include be a substantially flat piece of rigid material, such as metal, configured to receive one or more fasteners through one or more mounting holes 451 to couple the mounting bracket 408 to the blower housing 102. Further, as shown, in some embodiments, the backing portion 450 may include three distinct arms 460, from which each of the first, second, and third arm extensions 432, 436, 450 may respectively extend. In some embodiments, the backing portion 452 may include connecting portions 462 disposed between edges of the arms 460, as shown, for additional support.

Each of the first, second, and third arm extensions 432, 436, 450 may include an extension portion 470 and a mounting portion 472. The extension portions 470 may extend substantially perpendicularly, or at any other suitable angle, from respective edges of the backing portion 452 and the respective arms 460. The mounting portions 472 may further extend substantially perpendicularly, or at any other suitable angle, from respective ends of the extension portions 454. As a result, the mounting portions 472 may extend substantially parallel to the backing portion 452 and may be spaced apart from the backing portion 452 via the extension portions 470. However, it should be appreciated that the extension portions 470 and mounting portions 472 may have other orientations in other embodiments.

As shown, the idler arm 406 may be coupled to the mounting portion 472 of each of the first, second, and third arm extensions 432, 436, 450. Particularly, the idler arm 406 is coupled to the third arm extension 450 via the pivot fastener 420, which extends through the idler arm 406 and through the mounting portion 472 of the third arm extension 450. The idler arm 406 is coupled to the first arm extension 432 via the tension spring 422, which extends between and is coupled to the first side 430 of the idler arm 406 and the mounting portion 472 of the first arm extension 432. Specifically, as shown, the first side 430 may include a series of attachment points 480, such as holes, pins, hooks, tension adjustment features, and/or other connection points, to which the tension spring 422 may be coupled. The mounting portion 472 of the first arm extension 432 may include a mounting attachment point 482, such as a hole, hook, or other mounting feature, to which the tension spring 422 may also be coupled. For example, in the currently illustrated embodiment, the tension spring 422 includes two hooks 484 disposed at respective ends of the tension spring 422. One of the hooks 484 may extend through the one of attachment points 480, and the other of the hooks 484 may extend through the mounting attachment point 482 to couple the idler arm 406 to the first arm extension 432. As shown, the attachment points 480 may provide discrete attachment points for the tension spring 422. In some embodiments, the attachment points 480 may include continuous attachment points, such as a sliding mechanism or elongated slot, for the tension spring 422 to couple to the idler arm 406. In some embodiments, the tension spring 422 may include any suitable coupling elements, such as fasteners, disposed at the ends of the tension spring 422 that are configured to couple to any suitable corresponding coupling elements, such as springs 402, of the idler arm 406 and the first arm extension 432. As will be appreciated, the tension spring 422 may be coupled to any of the attachment points 480 to adjust tension in the tension spring 422. For example, the tension spring 422 is configured to separately couple to a first attachment point 480 and a second attachment point 480 to adjust a force applied to the idler arm 406 by the tension spring 422.

The idler arm 406 is further coupled to the second arm extension 436 via the compression spring 424, which extends between and is coupled to the second side 434 of the idler arm 406 and the mounting portion 472 of the second arm extension 436. Particularly, as shown, a first edge 483 of the mounting portion 472 of the second arm extension 436 and a second edge 485 of the second side 434 of the idler arm 406 may each include a coupling element 486 to which the compression spring 424 may be coupled. In the currently illustrated embodiment, the coupling element 486 includes a substantially cylindrical extension configured to extend through or into an internal diameter of the compression spring 424. In other words, ends of the compression spring 424 may extend about outer surfaces of the coupling elements 486. In some embodiments, the compression spring 424 may be integrally coupled or fixed to the coupling elements 486, such as via welding or fasteners. Additionally or alternatively, the compression spring 424 may be supportively coupled to the coupling elements 486, such that the compression spring 424 may uncouple from the coupling elements 486 if a distance between the coupling elements 436 increases beyond a resting length of the compression spring 424. The connecting elements 486 may be integrally part of, or coupled to, the first edge 483 of the second arm extension 436 and the second edge 485 of the second side 434 of the idler arm 406. As shown, the first edge 483 and the second edge 485 may both be angled edges that are angled to face each other. Accordingly, the compression spring 424 may compress substantially linearly as the second edge 485 moves toward the first edge 483 during operation of the belt tensioner 114, as described herein.

The tension spring 422 may be coupled to the idler arm 406 and the first arm extension 432 at a first angle 492 relative to a longitudinal axis 496 of the idler arm 406. The longitudinal axis 496 of the idler arm 406 may extend through the pivot point 410, as shown. In some embodiments, the longitudinal axis 496 may define a boundary or midpoint between the first side 430 and the second side 434 of the idler arm 406. In some embodiments, the first side 430 and the second side 434 of the idler arm 406, as defined by the longitudinal axis 496, may further refer to respective first and second sides of the idler pulley 404 relative to the longitudinal axis 496. The compression spring 424 may be coupled to the idler arm 406 and to the second arm extension 436 at a second angle 497 relative to the longitudinal axis 496. In some embodiments, the first angle 492 and/or the second angle 497 may be determined based on a desired force to be applied to the drive belt 108 via the idler pulley 404. Generally, respective torques applied to the idler arm 406 from the tension spring 422 and the compression spring 424 may determine the amount of force applied to the drive belt 108 via the idler pulley 404.

Keeping this in mind, the first angle 492 may be adjusted by changing the attachment point 480 on the idler arm 406 to which the tension spring 422 is coupled. In some embodiments, assuming a constant tensile force in the tension spring 422, as the first angle 492 increases, the direction of force of applied to the idler arm 406 may move towards being substantially perpendicular relative to the longitudinal axis 494. Accordingly, in such embodiments, the torque applied to the idler arm 406 may increase as the first angle 492 increases. However, in some embodiments, the tension in the tension spring 422 may increase, such as due to elongation of the tension spring 422, as the first angle 492 decreases, which may cause an increase to the torque applied to the idler arm 406. As such, a user may exchange the tension spring 422 to adjust the k constant or resting length of the tension spring 422 and/or may adjust the first angle 492 in order to adjust a torque applied to the idler arm 406 by the tension spring 422.

Similarly, in some embodiments, the second angle 497 may be chosen, such as during manufacturing of the first and second edges 483, 485, to select the torque applied to the idler arm 406 by the compression spring 424. Indeed, similar to the first angle 492, assuming a constant compressive force in the compression spring 424, as the second angle 497 increases, the direction of force of applied to the idler arm 406 may move towards being substantially perpendicular relative to the longitudinal axis 494. Accordingly, in such embodiments, the torque applied to the idler arm 406 may increase as the second angle 492 increases. As such, a user may exchange the compression spring 424 to adjust the k constant or resting length of the compression spring 424 and/or a manufacturer may adjust the second angle 497 in order to adjust a torque applied to the idler arm 406 by the tension spring 422.

Figure 22:
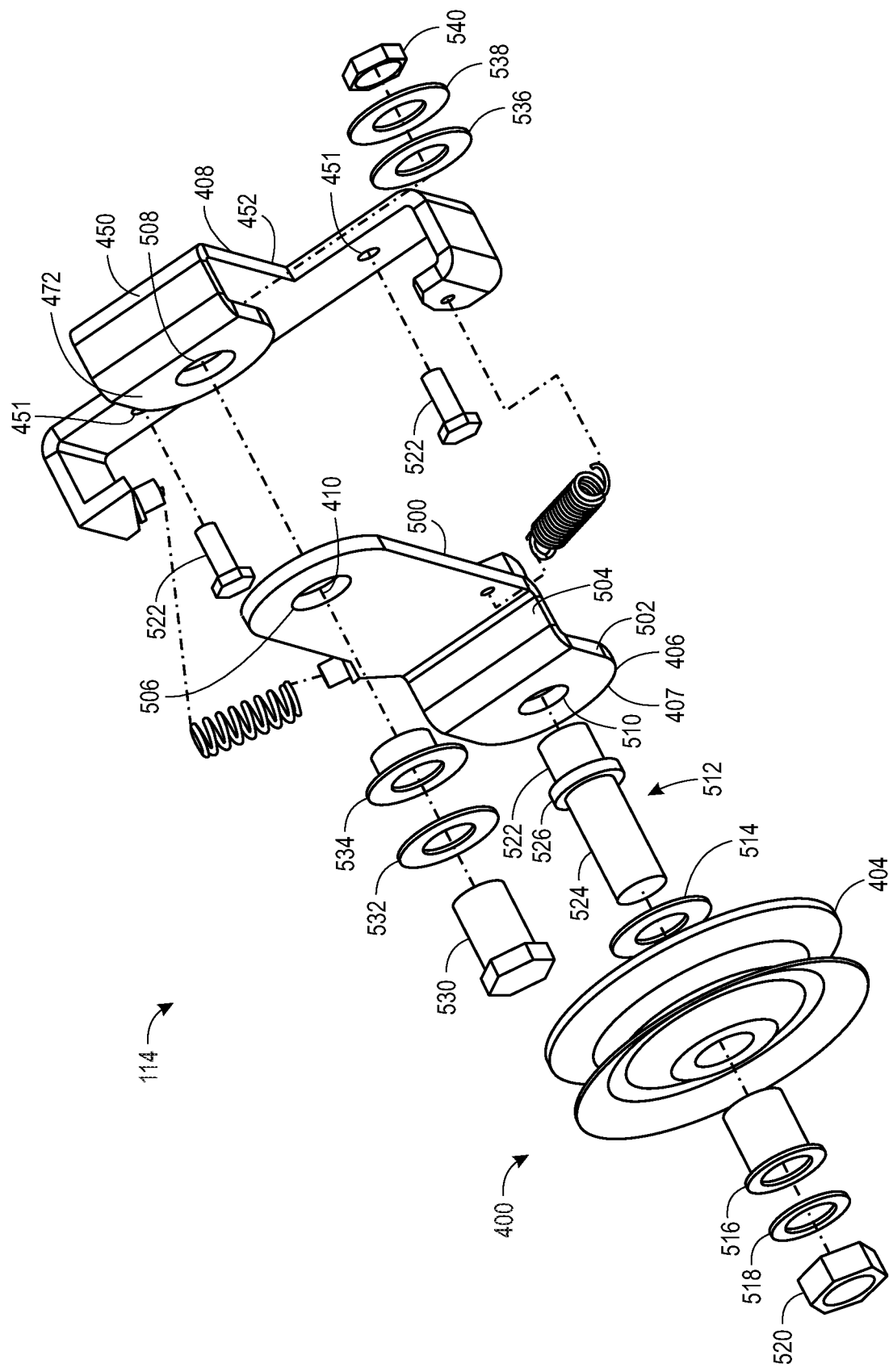
FIG. 22 is an exploded perspective view of an embodiment of a belt tensioner, in accordance with aspects of the present disclosure.

FIG. 22 is an exploded perspective view of an embodiment of the belt tensioner 114. As shown, the belt tensioner 114 includes the idler arm 406, the idler pulley assembly 400, the pivot fastener 420, the mounting bracket 408, and additional elements, as described herein. The idler arm 406 includes a spring mounting portion 500, an idler pulley mounting portion 502, and an offset portion 504. The offset portion 504 extends between the spring mounting portion 500 and the idler pulley mounting portion 502. The spring mounting portion 500 may be coupled to the springs 402, as discussed above. The spring mounting portion 500 may also include a pivot aperture 506 disposed about the pivot point 410 and configured to receive the pivot fastener 420. The idler pulley mounting portion 502 may be disposed substantially parallel to the spring mounting portion 500 and includes the distal end 407. The distal end 407 includes an idler aperture 510 configured to receive the idler pulley assembly 400, as discussed in further detail below. The offset portion 504 may be disposed substantially perpendicularly, or at any suitable angle, to the spring mounting portion 500 and to the idler pulley mounting portion 502.

The idler pulley mounting portion 502 is offset from the spring mounting portion 500 by the offset portion 504 in order for the drive belt 108 to directly contact the idler pulley 404 and not contact certain other portions of the belt tensioner 114 during operation. Indeed, as shown, the idler pulley mounting portion 502 may be substantially disposed in a first plane, and the spring mounting portion 500 may be substantially disposed in a second plane. The first plane and the second plane may be disposed substantially parallel to each other and may be spaced part by the offset portion 504.

The idler pulley assembly 400 may include a shaft 512, a washer or ring 514, the idler pulley 404, a bushing 516, a washer or ring 518, and a nut 520. As shown, the shaft 512 may include a first side 522 and a second side 524 defined by an annular ridge 526 disposed therebetween. The first side 522 of the shaft 512 may extend through the idler aperture 510. The first side 522 may couple to a nut or other fastener to couple the shaft 512 to the idler arm 406. The second side 524 of the shaft 512 may extend sequentially through the ring 514, the idler pulley 404, the bushing 516, the washer 518, and the nut 520, as shown. The ring 514 and the bushing 516 are configured to reduce friction experienced during rotation of the idler pulley 404. Indeed, the bushing 516 may be disposed radially between the idler pulley 404 and the shaft 512, relative to a longitudinal or rotational axis of the shaft 512, to reduce friction of the idler pulley 404 on the shaft 512. The nut 520 is configured to fasten the idler pulley 404 to the shaft 512, and the washer 518 is configured to improve the fastening function of the nut 520. However, it should be understood that the idler pulley assembly 400 may include any suitable types and arrangements of components to fasten the idler pulley 404 to the distal end 407 of the idler arm 406 and to reduce friction of the idler pulley 404 on the shaft 512 during rotation of the idler pulley 404. Further, as discussed herein, the idler pulley 404 may be formed of a nylon material configured to promote or enable self-lubrication of the idler pulley 404. That is, the nylon material of the idler pulley 404 may transfer microscopic amounts of material to the bushing 516, or other surface against which the idler pulley 404 may rotate, to create a film that lubricates an interface between the bushing 516 and the idler pulley 404.

The pivot fastener 420 may include a bolt 530, a first washer 532, a bushing 534, a second washer 536, a gasket 538, and a nut 540. As shown, the bolt 530 may extend sequentially through the first washer 532, the bushing 534, the pivot aperture 506, a mounting aperture 508 disposed through the mounting portion 472 of the third arm extension 450 of the mounting bracket 408, the second washer 536, the gasket 538, and the nut 540. The bushing 534 may be disposed radially between the idler arm 406 and the bolt 530, relative to longitudinal or rotational axis of the bolt 530, to reduce friction between the idler arm 406 and the bolt 530 during rotation of the idler arm 406. The first and second washers 532, 536 are configured to improve coupling between elements of the pivot fastener 420, such as by increasing distributions of fastening forces of the bolt 530 and of the nut 540. The gasket 538 is configured to enable sealing and/or reduce abrasion or corrosion between elements of the pivot fastener 420. However, it should be understood that the pivot fastener 420 may include any suitable types and arrangements of components to fasten the idler arm 406 to the third arm extension 450 of the mounting bracket 408 and to reduce friction during rotation of the idler arm 406.

As discussed above, the mounting bracket 408 is configured to be coupled directly to the blower housing 116.

Accordingly, the mounting bracket 408 may include the mounting holes 451 configured to receive mounting fasteners 552, such as screws, bolts, rivets, or other fasteners. The mounting fasteners 552 may extend through the backing portion 452 of the mounting bracket 408 and engage with an external surface, such as the blower housing 116 or other structure of the blower assembly 102, to mount the belt tensioner 114 to the external surface.

Figure 23:
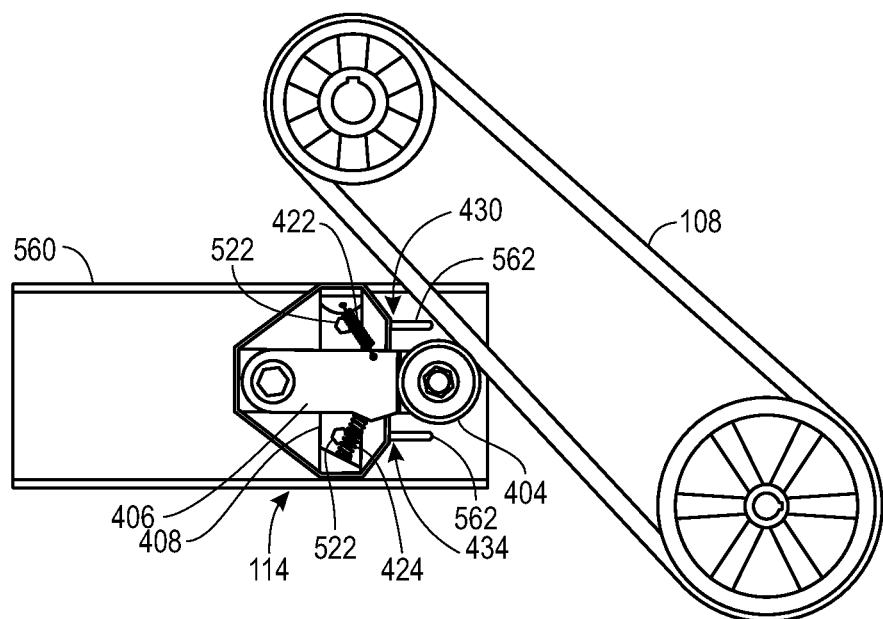
FIG. 23 is a front view of an embodiment of a belt tensioner, in accordance with aspects of the present disclosure.
Figure 24:
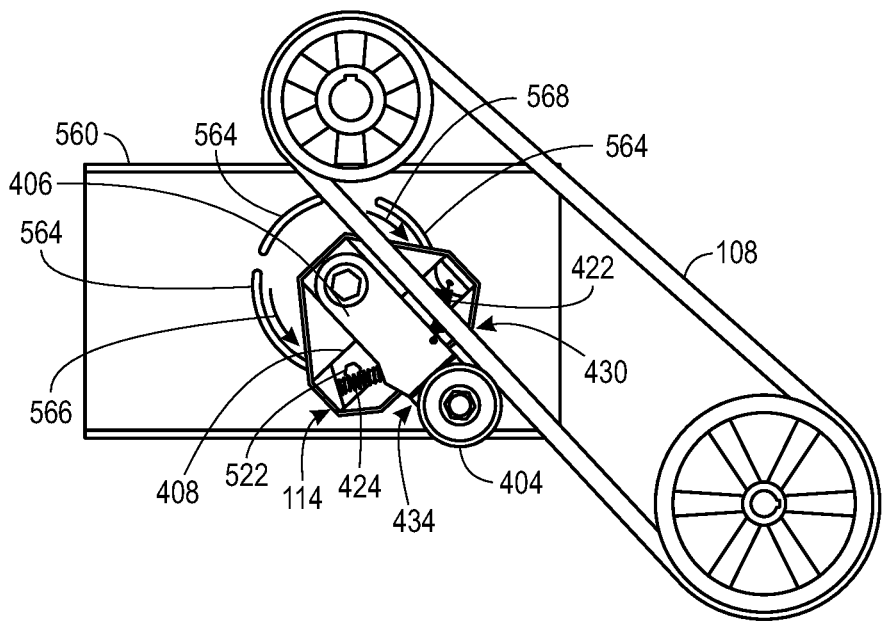
FIG. 24 is a front view of an embodiment of a belt tensioner, in accordance with aspects of the present disclosure.

FIGS. 23 and 24 are side views of the belt tensioner 114 coupled to a blower structure 560, such as a mounting plate, in various arrangements relative to the drive belt 108. The blower structure 560 may be a part of the blower housing 116, part of the blower assembly 102, and/or a part of a separate panel that is coupled to the blower housing 116. As shown, the belt tensioner 114 may be positioned relative to the drive belt 108 such that the belt tensioner 114 contacts the drive belt 108 adjacent to the first side 430 of the idler arm 406. In other words, the belt tensioner 114 may contact the drive belt 108 such that, in response to the idler pulley 404 contacting the drive belt 108, the tension spring 422 may elongate and the compression spring 424 may compress. Particularly, it should be understood that the belt tensioner 114 may be utilized with any orientation of the drive belt 108 as long as the belt tensioner 114 is configured to contact the drive belt 108 adjacent to the first side 430 to enable actuation of the springs 402, as described above.

Specifically, FIG. 23 is a side view of the belt tensioner 114 engaged with the drive belt 108, where the belt tensioner 114 is configured to be linearly adjusted relative to the blower structure 560 and relative to the drive belt 108. To this end, the blower structure 560 may include one or more linear adjustment slots 562. The linear adjustment slots 562 may be elongated, substantially linear slots disposed through the blower structure 560 that are configured to receive the mounting fasteners 522. Particularly, as shown, the mounting fasteners 522 may extend through the mounting bracket 408 and engage with the linear adjustment slots 562. The mounting fasteners 522 may be torqued in a first direction, or tightened, to fix the mounting bracket 408 to the blower structure 560 at a desired linear position along the linear adjustment slots 562. The mounting fasteners 522 may be torqued in a second direction, or loosened, to loosen the mounting fasteners 522 and allow linear positional adjustment of the mounting fasteners 522 and the mounting bracket 408 along the linear adjustment slots 562. In this manner, a position of the belt tensioner 114 may be linearly adjustable relative to the drive belt 108, and a force of belt tensioner 114 applied to the drive belt 108 may be correspondingly adjusted. Indeed, as the belt tensioner 114 is adjusted linearly towards the drive belt 108, the force applied by the idler pulley 404 to the drive belt 108 may increase. Correspondingly, as the belt tensioner 114 is adjusted linearly away from the drive belt 108, the force applied by the idler pulley 404 to the drive belt 108 may decrease.

Further, FIG. 24 is a side view of the belt tensioner 114 engaged with the drive belt 108 and configured to be rotationally adjusted relative to the blower structure 560 and relative to the drive belt 108. To this end, the blower structure 560 may include one or more arcuate adjustment slots 564. The arcuate adjustment slots 564 may be elongated, substantially arcuate or circumferential slots formed through the blower structure 560 that are configured to receive the mounting fasteners 522. Particularly, as shown, the mounting fasteners 522 may extend through the mounting bracket 408 and engage with the arcuate adjustment slots 564. The mounting fasteners 522 may be torqued in a first direction, or tightened, to fix the mounting bracket 408 to the blower structure 560 at a desired rotational position. The mounting fasteners 522 may be torqued in a second direction, or loosened, to loosen the mounting fasteners 522 and allow rotational, positional adjustment of the mounting fasteners 522 and the mounting bracket 408 along the arcuate adjustment slots 564. In this manner, a position of the belt tensioner 114 may be rotationally adjustable relative to the drive belt 108. As such, the force applied by the belt tensioner 114 to the drive belt 108 may be adjusted. Indeed, as the belt tensioner 114 is adjusted rotationally towards the drive belt 108, such as in a counter-clockwise direction 566, the force applied by the idler pulley 404 to the drive belt 108 may increase. Correspondingly, as the belt tensioner 114 is adjusted rotationally away from the drive belt 108, such as in a clockwise direction 568, the force applied by the idler pulley 404 to the drive belt 108 may decrease.

In some embodiments, the belt tensioner 114 may be implemented as a retrofit application to a previously-existing, such as a previously-installed or previously-manufactured, blower or blower assembly 102. Additionally or alternatively, the belt tensioner 114 may be manufactured and installed with the blower assembly 102 by an original equipment manufacturer (OEM) when the blower assembly 102 is originally manufactured. Further, it is to be understood that the belt tensioner 114, as discussed herein, may be applied to any application that may utilize a drive belt to drive operation of one or more components, such as automotive applications, power production applications, HVAC applications, and so forth. Moreover, it should also be understood that features of any of the embodiments discussed herein may be combined with any other embodiments or features discussed herein.

Accordingly, the present disclosure is directed to a belt tensioner for a blower assembly that is configured to maintain a tension in a drive belt to avoid slippage of the drive belt during normal loading conditions and to enable efficient and convenient adjustment of the tension in the drive belt. The belt tensioner may be rigidly mounted to a blower housing of a blower assembly. Particularly, the belt tensioner may include a mounting bracket that is rigidly coupled to the blower housing. In one embodiment, the belt tensioner further includes an adjustment assembly configured to enable rotation of an idler arm and an idler pulley about a fulcrum to adjust a tension in the drive belt. The idler arm may be L-shaped, such that the adjustment assembly is configured to cause a first portion of the idler arm to increase a force on the drive belt by rotating a second portion, which extends at an angle from the first portion, about a fulcrum of the L-shaped idler arm.

In some embodiments, the belt tensioner may include a lock plate and a guide rail coupled directly to the blower housing. The belt tensioner may further include an idler mounting plate configured to mount an idler pulley thereto and configured to translate within the guide rail as a result of torqueing of a bolt extending through the lock plate and the idler mounting plate.

In some embodiments, the belt tensioner may include a mounting plate coupled directly to the blower housing, an idler arm coupled to the mounting plate and configured to couple to an idler pulley, and a set of linear springs coupled to the idler arm and to the mounting plate. The set of linear springs are configured to actuate in response to a reactive load applied to the idler pulley by the drive belt during engagement between the idler pulley and the drive belt. In this manner, the pair of springs may automatically adjust a tension in the drive belt as the drive belt loosens over time or fluctuates during normal operation.

Accordingly, the belt tensioner is configured to adjust a tension in a drive belt through simple adjustments and without positional adjustment of shafts or pulleys that are drivingly linked by the drive belt.

While only certain features and embodiments of the present disclosure have been illustrated and described, many modifications and changes may occur to those skilled in the art, such as variations in sizes, dimensions, structures, shapes and proportions of the various elements, values of parameters, mounting arrangements, use of materials, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the embodiments, all features of an actual implementation may not have been described, such as those unrelated to the presently contemplated best mode of carrying out the disclosure, or those unrelated to enabling the claimed features. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A belt tensioner for a blower assembly, comprising:
    a mounting bracket configured to couple directly to the blower assembly;
    an idler arm configured to couple to the mounting bracket at a connection point and in an angular position relative to a base of the blower assembly, wherein the idler arm comprises an idler pulley mounting portion and an adjustment plate disposed crosswise to the idler pulley mounting portion, and wherein the angular position is adjustable about the connection point;
    a bolt configured to extend through the mounting bracket and engage with the adjustment plate of the idler arm, wherein the angular position of the idler arm is adjustable via rotation of the bolt; and
    an idler pulley coupled to the idler pulley mounting portion of the idler arm, wherein the idler pulley is configured to engage with a drive belt of the blower assembly.

2. The belt tensioner of claim 1, wherein the mounting bracket is configured to couple directly to a blower housing of the blower assembly.

3. The belt tensioner of claim 1, wherein the bolt extends through the adjustment plate.

4. The belt tensioner of claim 1, wherein the adjustment plate has an elongated slot, and wherein the bolt extends through the elongated slot.

5. The belt tensioner of claim 1, comprising a spring disposed about the bolt between the adjustment plate and the mounting bracket to bias the adjustment plate and the mounting bracket away from one another.

6. The belt tensioner of claim 1, comprising:
    a curved cup coupled to the mounting bracket, and
    a curved washer disposed about and along the bolt, wherein the curved washer is configured to slide within the curved cup to enable angular movement of the bolt relative to the mounting bracket.

7. The belt tensioner of claim 1, wherein the idler pulley mounting portion has an L-shaped configuration, and wherein a fastener extends through a fulcrum of the L-shaped configuration to couple the idler arm to the mounting bracket.

8. The belt tensioner of claim 7, wherein the L-shaped configuration of the idler pulley mounting portion has a first portion coupled to the idler pulley and a second portion extending crosswise to the first portion relative the fulcrum.

9. The belt tensioner of claim 1, wherein the idler pulley mounting portion and the adjustment plate are integrally formed as one piece.

10. The belt tensioner of claim 1, wherein the bolt is configured to abut a surface of the adjustment plate.

11. A heating, ventilation, and/or air conditioning (HVAC) system, comprising:
    a blower assembly including a blower, a blower housing configured to house the blower, a motor configured to provide rotational power, and a drive belt configured to transfer the rotational power from the motor to the blower; and
    a belt tensioner including an L-shaped support having a first arm coupled to an idler pulley and having a second arm, wherein the second arm includes an arcuate slot formed therethrough, wherein the first arm and the second arm are coupled to one another at a bend, wherein the L-shaped support is rotatably coupled to the blower housing via a mounting bracket, wherein the idler pulley is configured to contact the drive belt to facilitate tensioning of the drive belt.

12. The HVAC system of claim 11, wherein the idler pulley is coupled to a distal end of the first arm.

13. The HVAC system of claim 11, wherein the L-shaped support is configured to rotate about a fulcrum, disposed at the bend between the first arm and the second arm, to facilitate the tensioning of the drive belt.

14. The HVAC system of claim 11, wherein the belt tensioner includes a bolt extending through the arcuate slot, and wherein the arcuate slot is configured to slide along the bolt during rotation of the L-shaped support.

15. The HVAC system of claim 11, wherein the belt tensioner includes a bolt extending through the bend of the L-shaped support and through the mounting bracket.

16. A blower assembly for a heating, ventilation, and/or air conditioning (HVAC) system comprising:
    a blower fan;
    a blower housing containing the blower fan;
    a drive belt coupled to the blower fan and configured to drive rotation of the blower fan;
    a belt tensioner including an L-shaped bracket that is coupled to the blower housing via a mounting bracket, wherein the L-shaped bracket is rotatably coupled to the mounting bracket at a bend of the L-shaped bracket;
    an adjustment plate disposed crosswise to the L-shaped bracket; and
    an adjustment assembly having a bolt extending through the mounting bracket, wherein the bolt is adjustable to apply a force to the adjustment plate to rotate the L-shaped bracket.

17. The blower assembly of claim 16, wherein the adjustment plate is integrally formed with the L-shaped bracket.

18. The blower assembly of claim 16, wherein the bolt is a threaded bolt configured to be linearly translated relative to the mounting bracket to cause the L-shaped bracket to rotate about the bend.

* * * * *